Feb. 26, 1952 H. J. ECK 2,586,798
AUTOMATIC MORTISING AND TENONING MACHINE
Filed Nov. 13, 1946 9 Sheets-Sheet 1
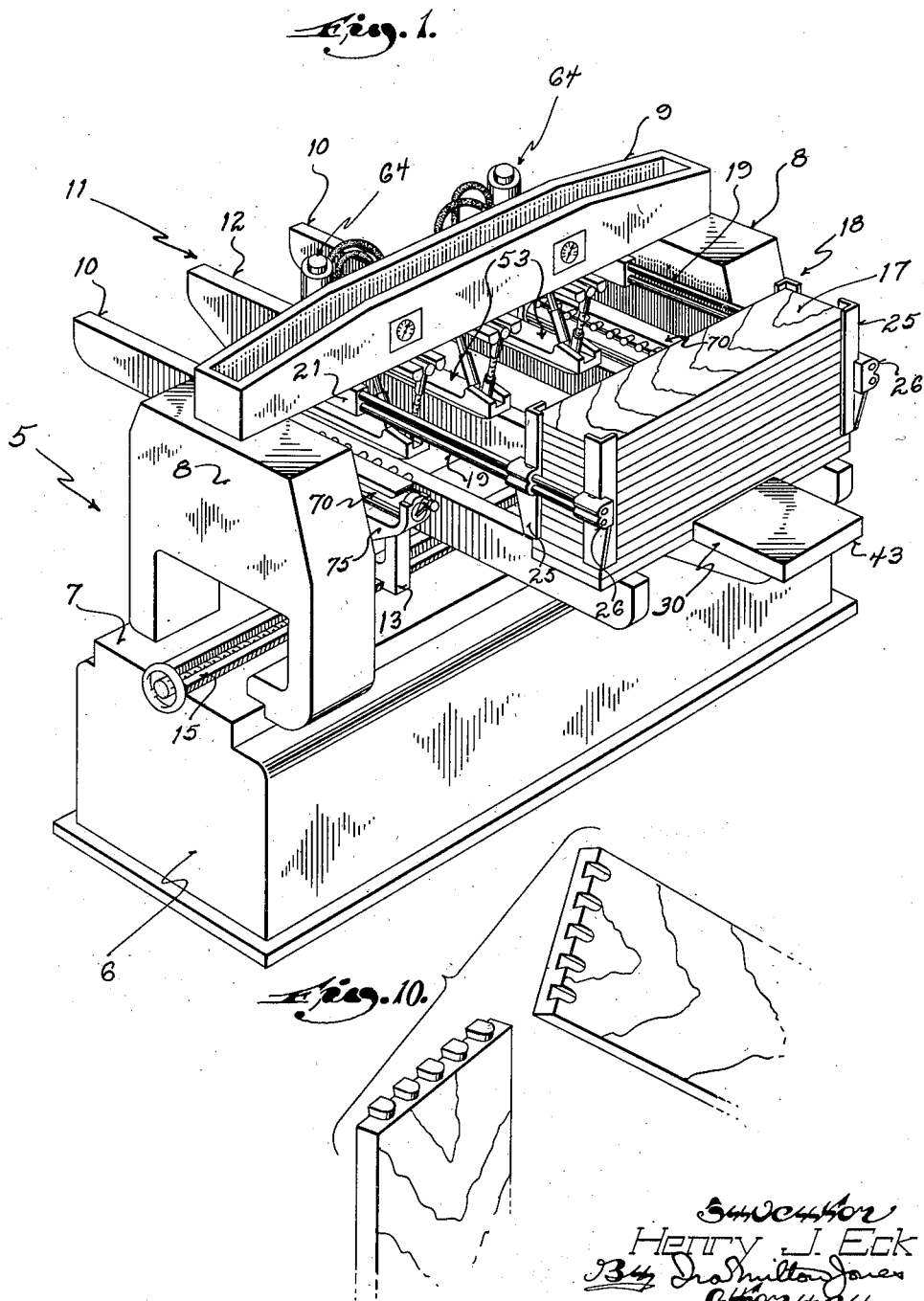

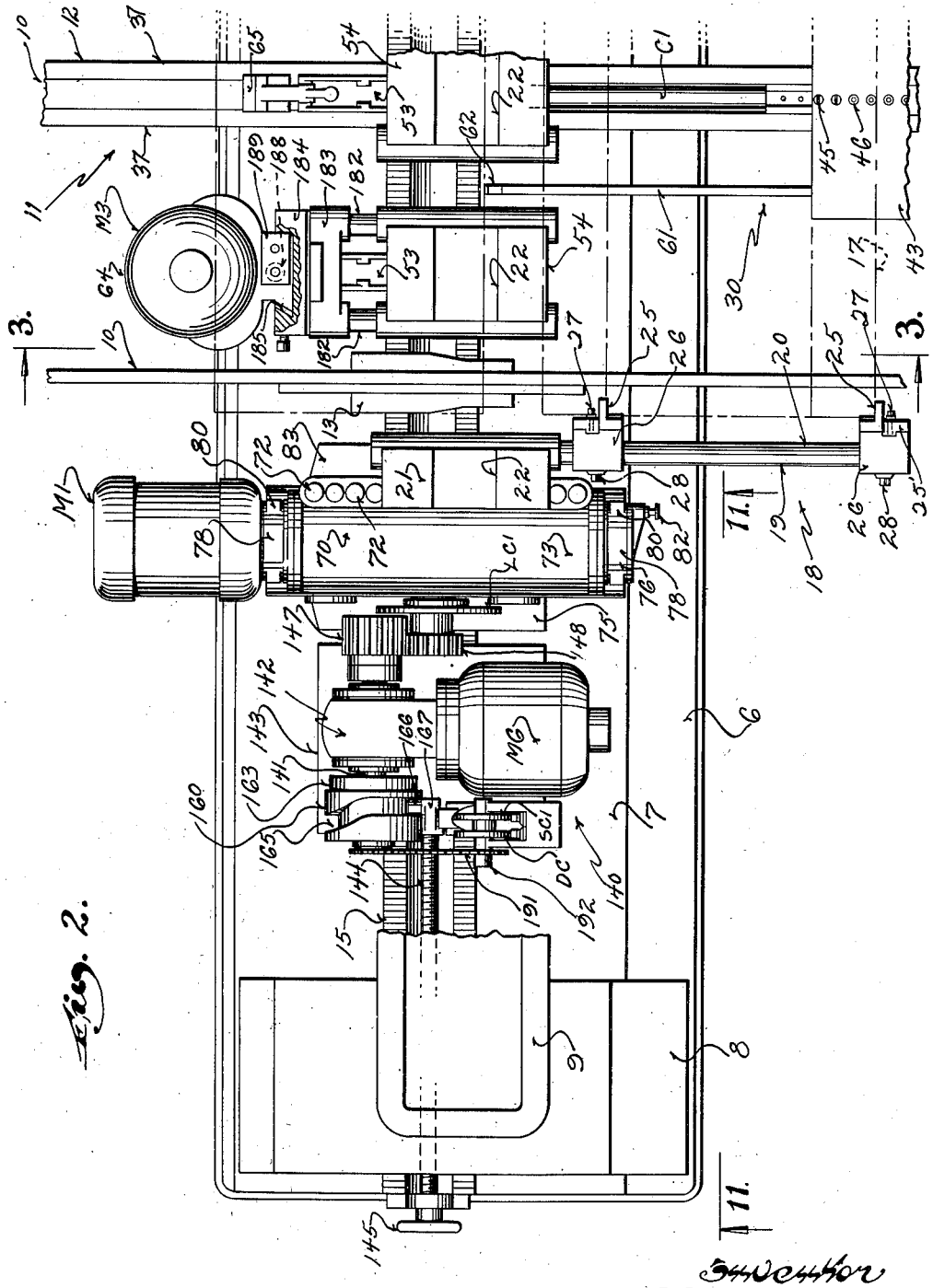

Feb. 26, 1952          H. J. ECK          2,586,798
AUTOMATIC MORTISING AND TENONING MACHINE
Filed Nov. 13, 1946          9 Sheets-Sheet 3
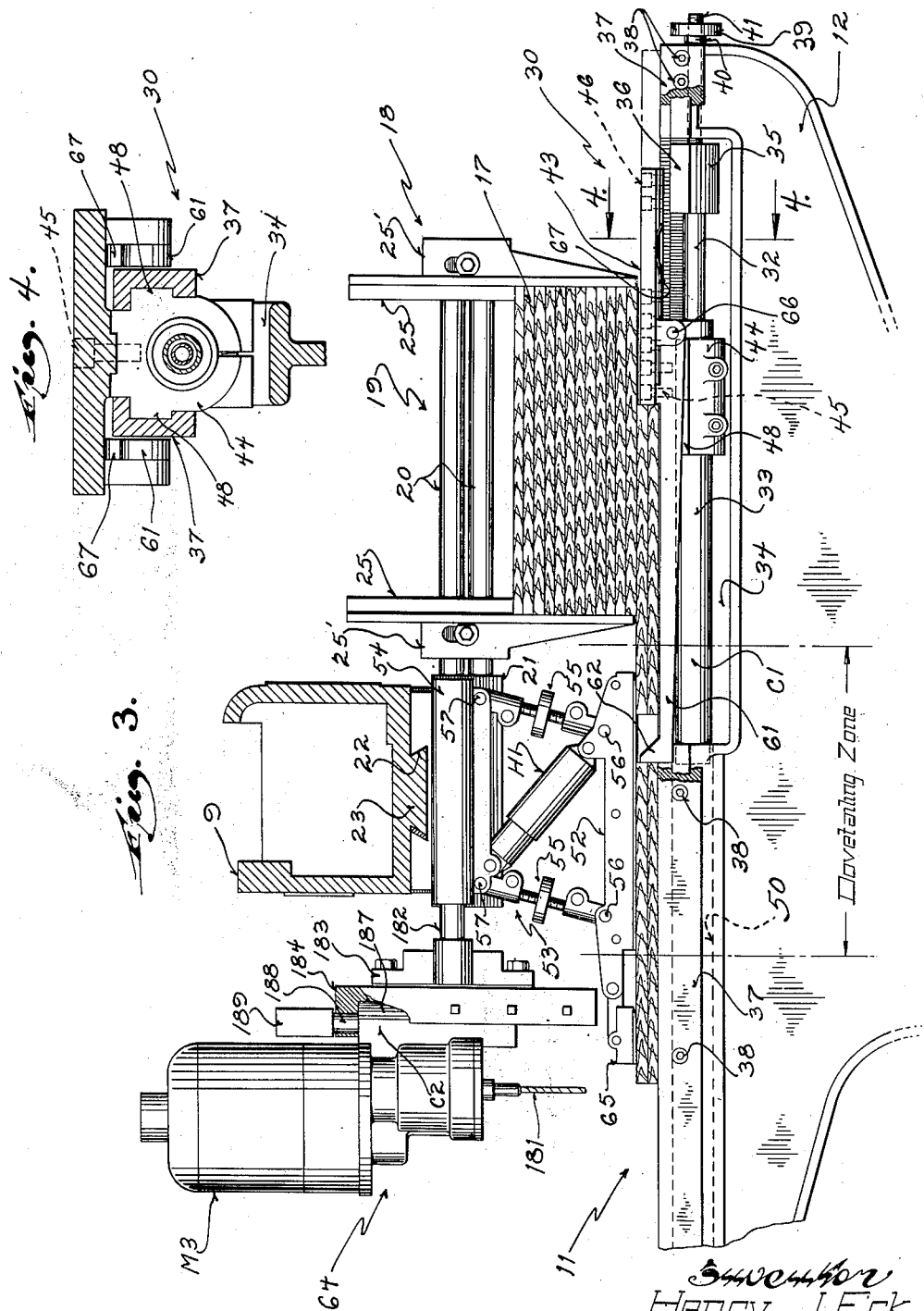

Feb. 26, 1952   H. J. ECK   2,586,798
AUTOMATIC MORTISING AND TENONING MACHINE
Filed Nov. 13, 1946   9 Sheets-Sheet 4
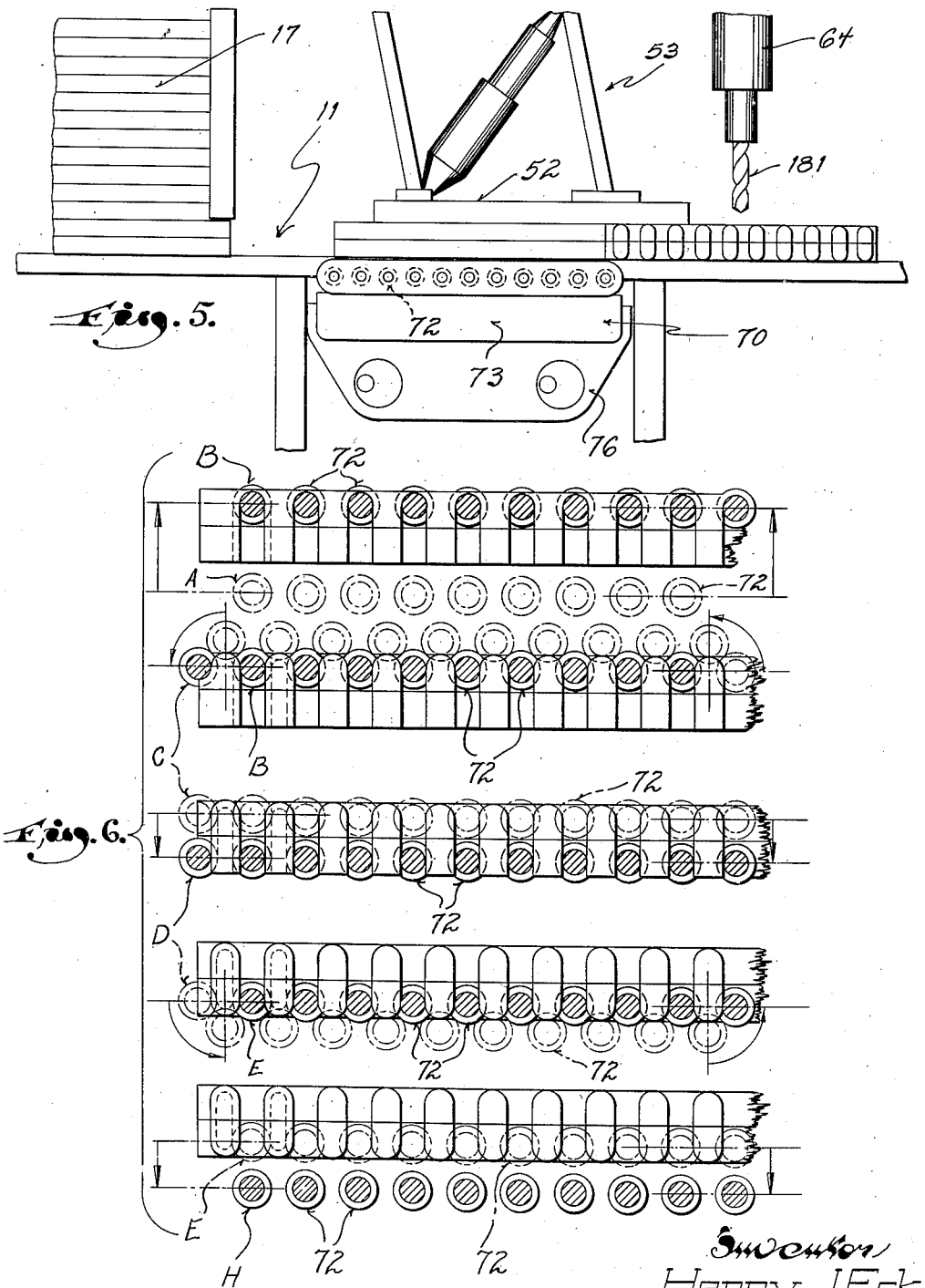

Feb. 26, 1952        H. J. ECK        2,586,798
AUTOMATIC MORTISING AND TENONING MACHINE
Filed Nov. 13, 1946        9 Sheets-Sheet 6
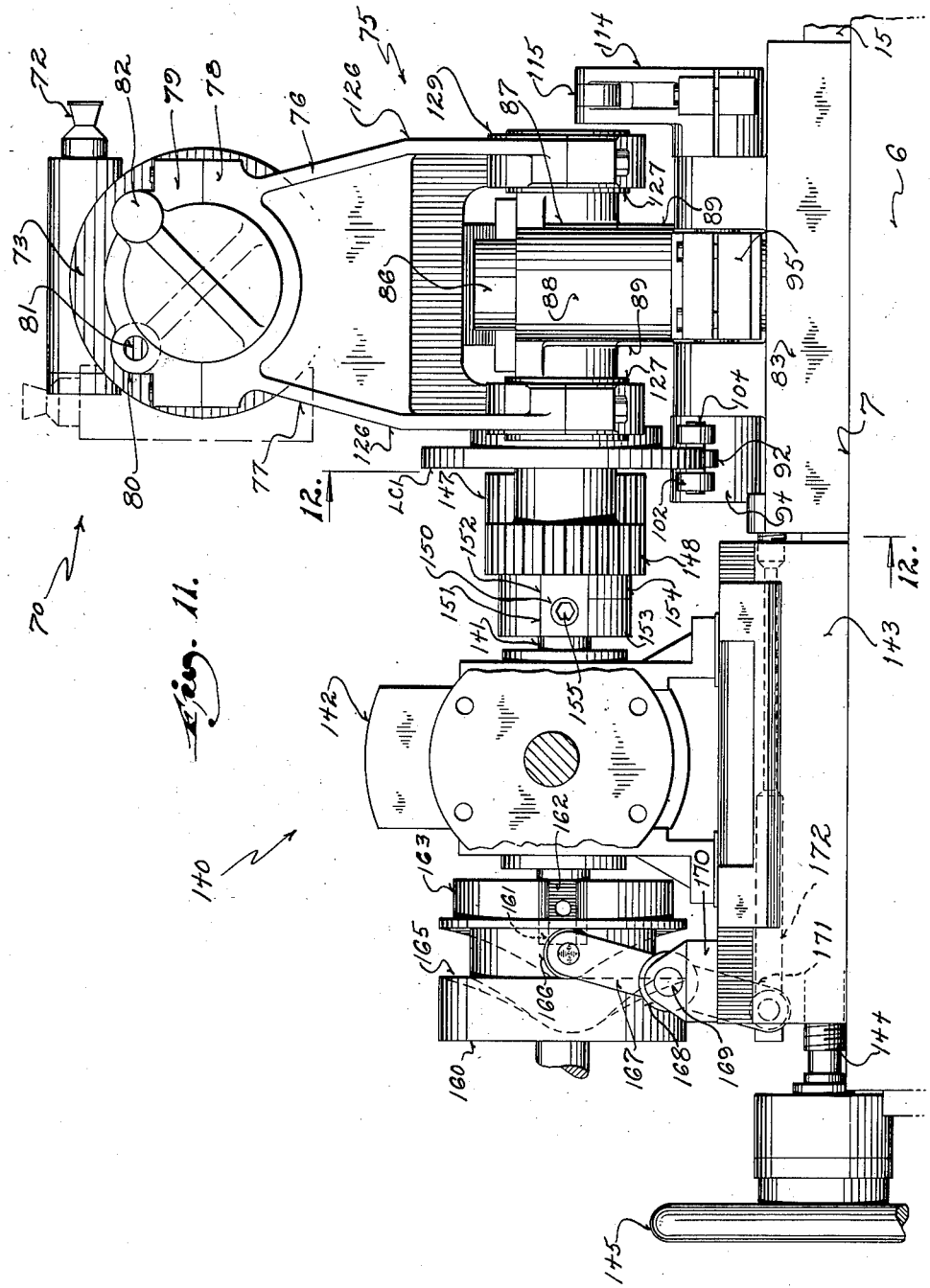

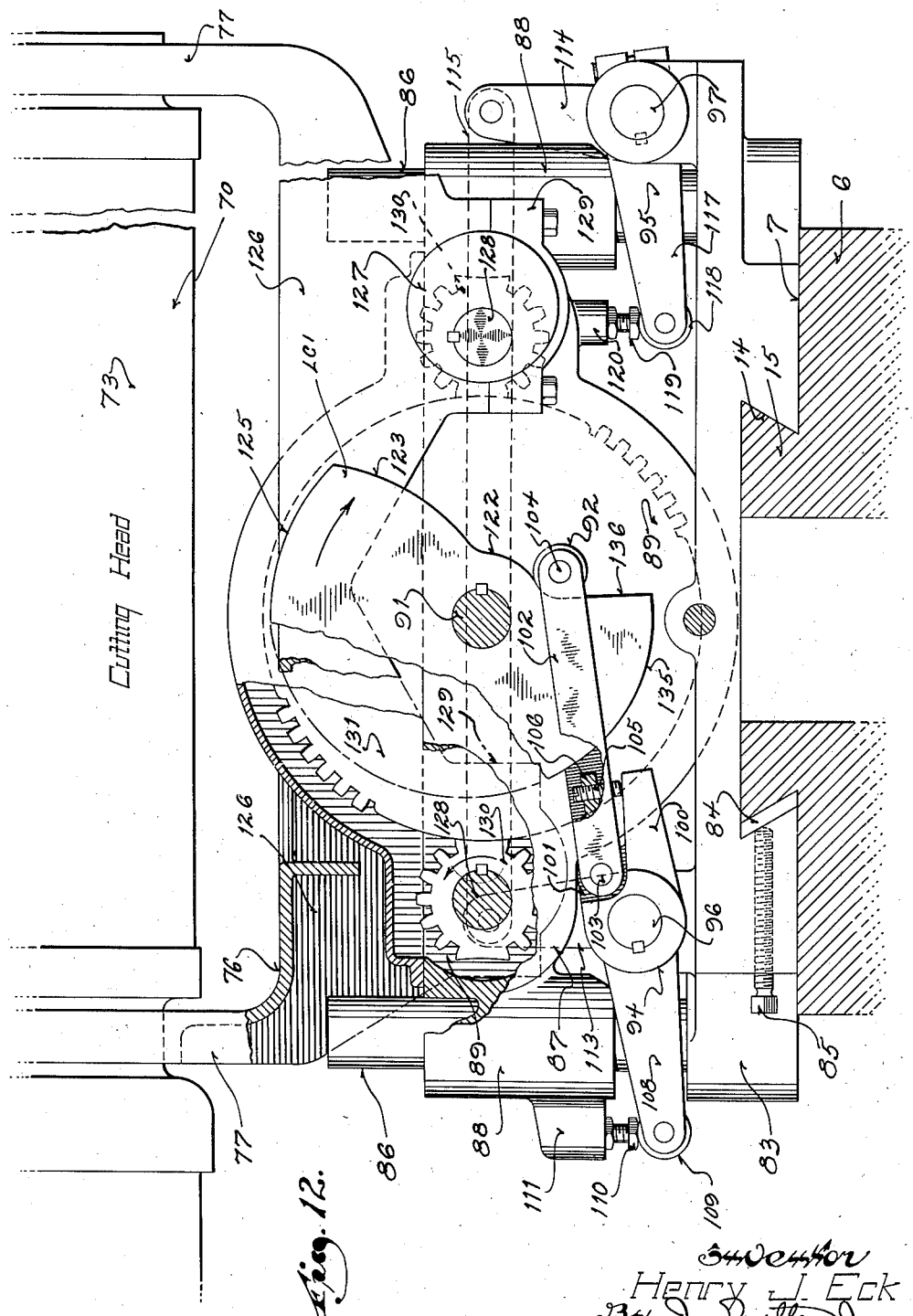

Feb. 26, 1952     H. J. ECK     2,586,798
AUTOMATIC MORTISING AND TENONING MACHINE
Filed Nov. 13, 1946     9 Sheets-Sheet 8

Inventor
Henry J. Eck

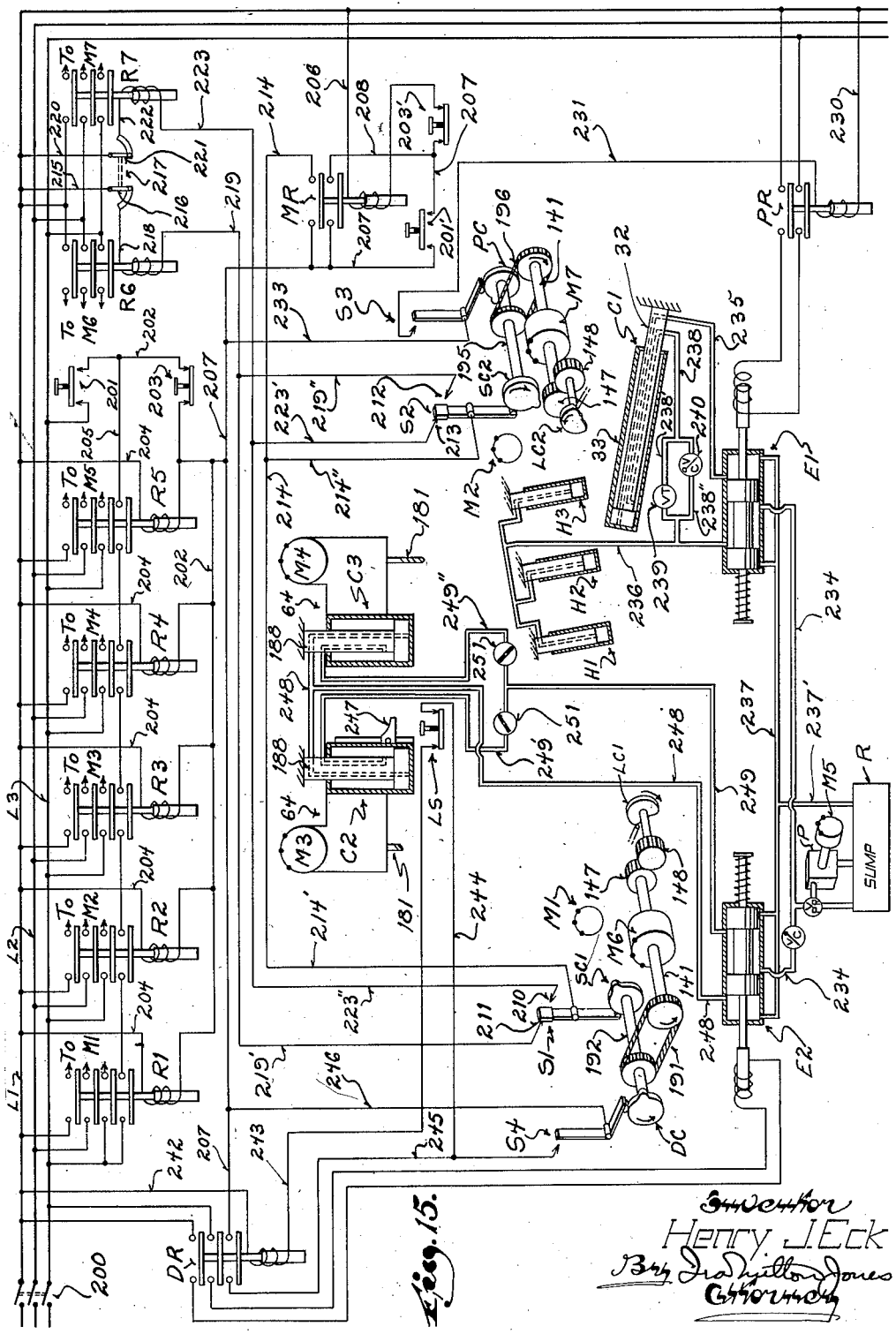

Patented Feb. 26, 1952

2,586,798

UNITED STATES PATENT OFFICE 2,586,798

AUTOMATIC MORTISING AND TENONING MACHINE

Henry J. Eck, Oshkosh, Wis., assignor to The Bell Machine Company, Oshkosh, Wis., a corporation of Wisconsin Application November 13, 1946, Serial No. 709,540

9 Claims. (Cl. 144—87)

This invention relates to woodworking machines such as are employed in the making of furniture, and has particular reference to machines for performing mortise and tenon cutting on the ends of boards intended for use as drawer parts.

Dovetailing machines presently in use are customarily provided with a stationary cutting head mounting a series of rotatable dovetail cutters and it is, therefore, necessary to move the boards to be dovetailed relative to the cutting head into and out of engagement with the cutters thereof for the cutting of mortises and tenons in the boards.

Obviously, this procedure requires the full time services of an operator of the machine, and entails much manual handling of the boards being cut by reason of the necessity of turning the boards end for end to successively present their opposite ends to the dovetail cutters.

For the cutting of tenons, for instance, it is necessary at present for the operator of the machine to move the boards or stock bodily with an orbital motion relative to a single stationary cutting head with the operator attempting to follow the outline of a template or cam to produce the desired cut in the boards.

Hence, the accuracy with which the tenons are cut largely depends upon the skill of the operator in manually moving the boards into and out of the cutters.

A straight in and out substantially reciprocatory motion is imparted to the boards by the operator to move one end thereof into and out of engagement with the dovetail cutters for the cutting of mortises in the boards.

Due to the fact that the speed with which the boards are fed to the cutters is left entirely to the judgment of the operator handling the boards, it will also be readily apparent that the smoothness or quality of the mortises and tenons formed in the boards suffers greatly if the operator attempts to "rush" the cutting operation, while if precaution is exercised by the operator in an attempt to preclude gouging and splintering of the work, the cutting operation is usually slowed down well below a safe maximum speed.

In general, therefore, it may be stated that in dovetail cutting machines used in the past the considerable handling of the boards by an operator of the machine resulted not only in questionable workmanship but also much waste of time.

With these objections to past practice in view, it is a primary object of this invention to provide a fully automatic dovetailing machine in which manual handling of the boards to be cut is reduced to a negligible minimum involving merely the single act of filling a supply magazine on the machine.

Another object of this invention resides in the provision of a dovetailing machine of the character described wherein the cutting head moves relatively to the boards to be cut while the same are held stationary in a predetermined position on the work table of the machine.

More specifically, it is an object of the present invention to provide a dovetailing machine with spaced opposite cutting heads which are movable relatively to work held in a predetermined work position on the table of the machine for the performance of either tenon or mortise cutting operations simultaneously on both ends of the boards.

A still further object of this invention resides in the provision of a dovetailing machine of the character described wherein tenons may be simultaneously formed on the opposite ends of a pair of boards held flatwise together by a pair of cutting heads movable relatively to the boards to carry their cutters into and out of cutting engagement with the opposite ends of the boards.

It is another object of this invention to provide a fully automatic dovetailing machine of the character described which operates to perform its cutting operations on the boards fed into the machine at a maximum rate of speed consistent with quality workmanship.

Another object of this invention resides in the provision of an automatic dovetailing machine wherein holes for drawer pulls or knobs may be drilled in the boards being operated on by the machine concomitantly with the cutting operation on the ends of the boards.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a perspective view looking down at the front and left-hand end of the dovetailing machine of this invention;

Figure 2 is a plan view of the machine only the left half of which is shown;

Figure 3 is a cross sectional view taken through Figure 2 on the plane of the line 3—3;

Figure 4 is a detail sectional view taken through Figure 3 on the plane of the line 4—4;

Figure 5 is a diagrammatic end view of the machine illustrating the manner in which boards to be dovetailed are presented to the dovetail cutters and to the drill attachment of the machine;

Figure 6 is a series of diagrammatic views illustrating the manner in which orbital motion of one cutting head assembly produces dovetail tenons in a pair of boards held flatwise together;

Figure 10 is a perspective view showing a pair of boards one having tenons and the other having mortises formed on one end thereof to produce an interlocking dovetailed connection;

Figure 11 is an enlarged side elevational view of one of the cutting head assemblies and the mechanism for driving the same with parts removed to better illustrate the arrangement of the mechanism;

Figure 12 is a cross sectional view having parts broken away to illustrate the mechanism for producing orbital motion of the cutting heads, said view being taken through Figure 11 along the plane of the line 12—12;

Figure 15 is a combined electrical wiring and hydraulic control diagram illustrating the means for automatically governing the operation of the dovetailing machine of this invention.

Figure 7:
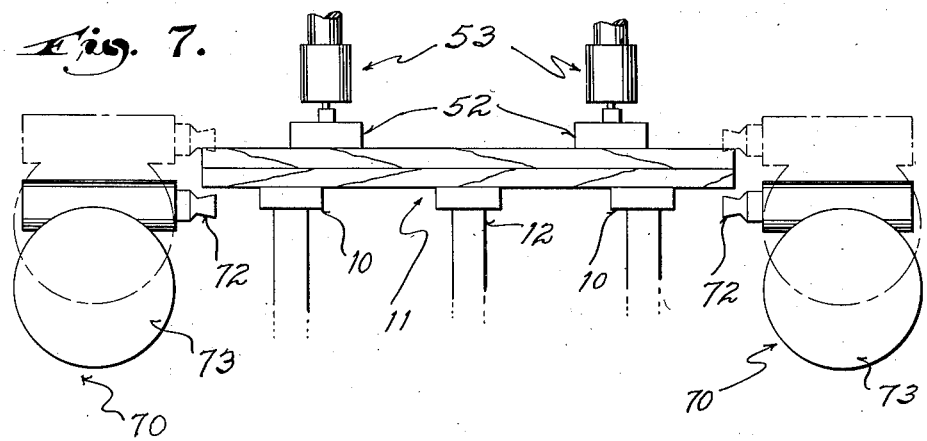
Figure 7 is a diagrammatic view illustrating the disposition of the two cutting heads for the simultanoeus cutting of dovetail tenons at both ends of a pair of boards held flatwise together on the work table of the machine.

Referring now more particularly to the accompanying drawings in which like numerals indicate like parts throughout the several views, the numeral 5 generally designates the dovetailing machine of this invention. As best shown in Figure 1, the machine comprises an elongated bed or base 6 upon the top surface 7 of which the work handling mechanism of the machine is mounted.

End frames 8 extending crosswise of the bed project in upright fashion from the top 7 of the base near its opposite ends, and a beam 9 of channel-like construction secured to the tops of the two end frames extends lengthwise of the base and substantially forms a bridge from which various mechanisms of the machine are adapted to be suspended.

A plurality of rails 10 extending transversely across the top of the base beneath the bridge 9 provide a work table 11 or supporting surface upon which boards to have dovetail cuts made in their opposite ends are supported during the cutting operation.

In the present case the machine has been shown with three such rails, with the center rail 12 occupying a position substantially medially between the end frames 8 and permanently fixed to the top of the base 6. The rails 10 at opposite sides of the center rail 12 each have a block 13 fixed thereon, as seen in Figure 2, the underside of which (not shown) is provided with a female dovetail groove such as that shown at 14 in Figure 12 to receive a male dovetail rail 15 projecting up from the top surface 7 of the base and extending the entire length of the base.

The dovetail connection between the outside rails 10 and the base, therefore, enable bodily adjusting motion of these rails to any of a number of different positions along the base with respect to the center rail 12, and inasmuch as the top surfaces of all of the rails lie in a common horizontal plane it will be apparent that the tops of the rails 10 and 12 provide a planar supporting surface or work table the width of which is adjustable to accommodate boards of various lengths placed thereon with the boards extending lengthwise of the base.

Set screws (not shown) are, of course, provided to lock the blocks 13 onto the male dovetail rail 15 so as to enable the outer rails 10 to be releasably held in any desired position of adjustment.

Attention is directed to the fact that the rails 10 and 12 have such length as to provide a work table or work supporting surface which extends both forwardly and rearwardly beyond the front and rear sides respectively of the base 6.

As shown in Figure 1, a stack of boards 17 to be dovetailed is adapted to be supported upon the overhanging front portion of the table from which position the boards are adapted to be fed either singly or in pairs in a manner to be later described to a dovetailing position in which they are adapted to have the dovetail cutting operations performed simultaneously on their opposite ends.

In order that the boards in the stack 17 may be held in a predetermined position all extending lengthwise of the base 6 and transversely across the outer ends of the rails 10 and 12 at the front of the machine, a magazine 18 for holding the boards is provided.

The magazine comprises a pair of transverse side frames 19 each consisting of a pair of superimposed rods 20 parallel to the rails but at such an elevation thereabove that their inner ends lie immediately under the bridge 9 while their outer ends extend forwardly to the front of the work table.

The pairs of rods 20 are rigidly held in their forwardly extending positions at opposite sides of the center rail 12 of the work table by slide blocks 21 each having the inner ends of one pair of rods anchored therein. The upper surfaces of these blocks have transverse female dovetail grooves therein such as indicated at 22 in Figure 3 to slidably receive a male dovetail rail 23 projecting from the bottom of the bridge 9 and extending longitudinally for the entire length of the bridge. The usual set screws (not shown) pass through the blocks 21 and engage the male dovetail member 23 on the bridge to releasably hold the blocks with the rods 20 projecting forwardly therefrom in any desired position of longitudinal adjustment beneath the bridge.

The outer ends of the rods 20 of each side frame of the magazine have a pair of upright angle shaped retaining members 25 carried by hubs 26 slidable along the rods of each side frame 19. Clamp screws 27 passing through slotted apertures in extensions 25' of the flanges of the angles which face the rods 20 and threaded into the hubs 26 provide for adjustably mounting the angle members 25 from the hubs.

Set screws 28 are provided to lock the hubs and the angle shaped members carried thereby at different positions of adjustment along the rods. Hence, the hubs 26, when locked in proper positions on the rods, maintain their retaining members 25 in such relationship as to define the corners of an upright hopper or magazine to receive the boards to be dovetailed, while the screws 27 hold the angle shaped retaining members in any desired position of vertical adjustment.

Referring to Figure 2, it will be noted that the lateral extensions 25' of the angle shaped retaining members 25 have tongues projecting from their backs to be received in complementary grooves in the hubs 26 to constrain adjusting motion of the angle members to an up and down reciprocatory movement. The angle shaped retaining members may thus be positioned to receive and embrace the corners of the stack of boards at each end thereof so that the angle members 25 provide a hopper or magazine open at its top and bottom into which boards to be cut may be loaded and stacked onto the front portion of the work table flatwise one on top of the other to be held in a predetermined position with respect to the base of the machine forwardly of that area of the work table directly beneath the bridge 9 which area may, for convenience, be designated as the dovetailing zone or work position of the boards.

The lowermost of the boards in the magazine are adapted to be transferred from the magazine to the dovetailing zone beneath the bridge 9 by means of a reciprocable pusher mechanism generally designated 30 and best seen in Figures 2, 3 and 4.

While any cyclically operable pusher mechanism may be employed, the pusher mechanism of this invention is preferably hydraulically operated and comprises a hydraulic ram C1 having a plunger 32 adapted to be stationarily connected with the center rail 12 of the work table, and a cylinder 33 reciprocable on the plunger so as to constitute the movable element of the hydraulic unit.

The hydraulic unit C1 is mounted substantially entirely in an elongated recess 34 formed in the top of the center rail 12 so as to be beneath the level of the work table and to have the movable element 33 thereof extending lengthwise of the rail and reciprocable transversely across the bottom of the magazine.

In order to mount the hydraulic pusher unit for lateral adjustment the forward end of the plunger 32 is anchored in a manifold block 35. The block 35 has ribs 36 projecting from its opposite sides slidably received in the open sides of channel members 37 secured to the opposite sides of the center rail 12 as by means of screws 38 with their open sides facing the rail.

It follows, therefore, that the hydraulic pusher unit C1 is adjustable bodily along the axis of the plunger by sliding of the manifold block 35 in the channels 37 on the center rail of the work table.

The manifold block 35 may be adjusted and held in any desired position of adjustment by rotating a knob 39 fixed on a hollow screw shaft 40 having left-hand screw threads on its exterior by which it is threaded into the forward end of the rail 12. The interior of the screw shaft 40 has right-hand threads engaged by the threads of a stud 41 anchored in the manifold block 35 so that turning of the screw shaft in or out imparts adjusting motion to the plunger 32.

The pusher per se indicated by the numeral 43 comprises a rectangular plate having its inner end portion disposed over the forward end of the cylinder 33 and adjustably secured to a cylinder block 44 fixed thereon as by means of screws 45 passing through the plate and threading into the cylinder block.

For the purpose of providing for coarse adjustment of the pusher plate 43 along the axis of the cylinder so as to enable feeding boards of different width, the plate is provided with a series of aligned holes 46 extending forwardly thereacross as seen in Figures 2 and 3, any pair of which may be aligned with the tapped holes in the cylinder block to receive the screws which fasten the plate thereto.

The cylinder block, being fixed to the movable element 33 of the hydraulic pusher unit may be employed to support the cylinder and guide the same during its reciprocatory motion, and for this purpose has opposite ribs 48 projecting from opposite sides thereof similar to the ribs 36 on the manifold block to likewise slidably engage in the open sides of the channels 37.

The recess 34 may have a length sufficiently merely to accomodate the cylinder block 44 in the fully extended position of the cylinder, and for this reason it is necessary to provide a bore 50 in the rail 12 into which the cylinder 33 travels during reciprocatory movement thereof toward the dovetailing zone.

As shown in Figure 3 the pusher plate 43 may have a thickness slightly less than twice the thickness of the boards in the magazine so that when moved from a retracted position shown in Figure 1 entirely forwardly of the magazine it will slide on top of the work table under the magazine and engage the forward side edges of the two lowermost boards therein and push said two boards from the bottom of the stack toward and into their dovetailing position on the work able (for tenon cutting) upon rearward reciprocatory movement of the cylinder 33.

It is to be understood, of course, that when two boards are being fed into the machine, the angle shaped retaining elements 25 are adjusted vertically to such positions as to enable the plate to slide freely thereunder. Obviously, if only the bottom board of the stack is to be transferred from the magazine to the dovetailing or working zone (for mortise cutting) a plate 43 having a thickness slightly less than that of the boards so as to engage with only the lowermost board of the stack is substituted for the plate shown, and the angle shaped retaining elements 25 are lowered to positions with their lower ends just above the lowermost board in the stack.

Forward reciprocatory motion of the movable element 33 of the feed mechanism C1 therefore effects transfer of either the lowermost one or two boards from the stack to the work or dovetailing position on the work table in which position they are adapted to have dovetail cutting operations performed simultaneously on their opposite ends.

As will be brought out hereinafter the boards fed from the bottom of the stack into the machine are brought to a predetermined position on the work table by means which controls the extent of rearward reciprocatory motion of the cylinder 33, and inasmuch as the rear edge of the pusher plate 43 is square, the boards are moved with a translating motion to their proper positions on the table for the dovetailing operation.

The boards being pushed into the working zone slide under a plurality of shoes 52 one on each of a set of three hydraulic clamps or holddowns generally designated 53. The shoes 52 of the holddown units are pivotally suspended from manifold blocks 54 mounted on the underside of the bridge 9 and each having a sliding dovetail connection thereto such as indicated by the numerals 22 and 23 in Figure 3 to enable the units to be adjusted longitudinally of the work table to thereby enable clamping of boards of different lengths.

Adjustable links 55 provide for pivotally suspending the shoes 52 from the manifold blocks, and as shown in Figure 3, the lower ends of the links for each shoe are pivotally connected thereto as at 56 near opposite ends of the shoe, while the upper extremities of the links have pivotal connections 57 with its manifold block 54. The pivot points 56 and 57 are each equidistant from one another so that the links and the shoe 52 of each unit together with their manifold blocks substantially form a parallelogram linkage by which the shoes may be swung upwardly and rearwardly away from the magazine by boards moving under the same while remaining flatwise engaged with the top sides of the boards.

When the boards are delivered to their work positions, however, downward pressure is adapted to be applied to the shoes 52 through the medium of hydraulic cylinders one for each clamp and designated H1, H2 and H3. The plungers of these cylinders are pivotally connected to the stationary manifold blocks near the rearmost pivot point 57 while the movable elements are pivotally connected to the shoes adjacent to the forward pivot point 56.

Pressure applied to the hydraulic cylinders H1, H2 and H3 causes the shoes to swing forwardly and downwardly into clamping engagement with boards on the work table to hold the same in place for the cutting operation.

Inasmuch as the hydraulic cylinders H1, H2 and H3 are adapted to be disconnected from their sources of fluid under pressure at the time work is fed under the holddown shoes, the shoes are enabled to move backwardly and upwardly with a more or less translating motion by the boards moving to their working positions.

During the feeding of either one or a pair of boards into the working zone, boards previously fed and having dovetail cuts made in their opposite ends are ejected from the dovetailing zone to make room for a new board or set of boards by means of a pair of ejector fingers 61 on the pusher unit movable with the cylinder 33 thereof. These fingers extend rearwardly along the work table just beneath its top surface at either side of the center rail 12.

Each of the fingers 61 has a toe 62 projecting upwardly above the surface plane of the work table ahead of the rear side edges of the boards lying behind the pusher plate 43 which engages the forward side edges of the cut boards to move the same out of the dovetailing zone and into a drilling position beneath a pair of drill heads 64 carried by the bridge 9 concomitantly with feeding of a new board or boards into the machine. Holddown extensions 65 on the rear of the shoes 52 engage the boards in the drilling position to firmly hold the same in place during the drilling operation.

As seen in Figure 3, the ejector fingers 61 are pivotally supported at their front ends as at 66 from lugs projecting from the underside of the pusher plate 43. Hence, any adjustment of the pusher plate 43 effects a corresponding adjustment of the ejector fingers. A leaf spring 67 fixed to the top of each ejector finger rearwardly of its pivotal support and extending forwardly beneath the pusher plate 43 bears against the plate to exert a yielding pressure on its ejector finger to hold the same in an operative elevated position from which the same may be readily cammed downwardly by engagement of an inclined surface on the toe 62 thereof with the rear side edges of boards fed to the working zone and held therein by the holddowns during retraction of the pusher cylinder.

After the toes 62 of the ejector fingers pass across the width of the board during the retracting stroke of the cylinder the springs 67 snap the fingers upwardly ahead of the front side edges of the boards in the dovetailing position and hold the fingers in readiness to effect ejection of cut boards upon the next successive feed stroke of the pusher unit.

One of the main features of the machine of this invention resides in the fact that two cutting heads 70 are employed to simultaneously act on the opposite ends of boards held in the work position by the holddowns 52. Both cutting heads are diagrammatically illustrated in Figures 7, 8, and 9 but only the left-hand cutting head 70 is shown in detail in Figures 2, 11 and 12. Inasmuch as these cutting heads are identical, however, a description of one will suffice for both.

Each cutting head comprises a series of dovetail cutters 72 mounted on an elongated gear housing 73 for rotation on parallel axes lying in a common plane spaced from and extending crosswise of the axis of the gear housing. A suitable drive shaft (not shown) extending lengthwise inside the housing 73 for rotation on the axis thereof is connected with the individual cutters through a more or less conventional drive mechanism which may comprise meshing spiral gears on the shaft and cutter spindles.

Inasmuch as the drive for the cutters per se forms no part of this invention it has not been illustrated. It is sufficient to note that separate electric motors M1 and M2 are provided for each set of dovetail cutters, and these motors are mounted on the gear housings 73 and connect with the drive shafts therein. Each cutting head is mounted at an elevation above the base 6 and just beneath the plane of the work table by means of a supporting structure 75. The supporting structure 75 holds the cutting head with the axis of its gear housing 73 transversely of the base 6.

Each of the supporting structures for the cutting heads includes a yoke 76, the opposite arms 77 of which extend upwardly and have bearings 78 on their extremities to receive the opposite ends of the gear housing 73 and to journal said housing for rotation on the common axis of the housing and the drive shaft therein.

The bearings 78 of the yokes are provided with bearing caps 79 which are removable to enable the cutting heads comprising the gear housings 73, the electric motors M1 and M2 carried thereby, and the dovetail cutters to be lifted off the yokes as a unit and reversed end for end. Such reversal of the heads enables disposition of the two sets of dovetail cutters with the common planes of their axes vertical and lying outside the axes of the gear housings of the two heads for the simultaneous cutting of mortises in the opposite ends of boards of average length and over, as seen in Figure 8, or enables disposition of the common planes of the cutter axes in vertical positions lying between the axes of the two gear housings as seen in Figure 9 for the simultaneous cutting of mortises in the opposite ends of relatively short boards having less than average length.

It will be understood, of course, that the heads are bodily adjustable longitudinally of the machine toward and from the ends of the work table to enable boards of different length to be "run" in the machine. This adjusting means, however, will be described later.

Figure 8:
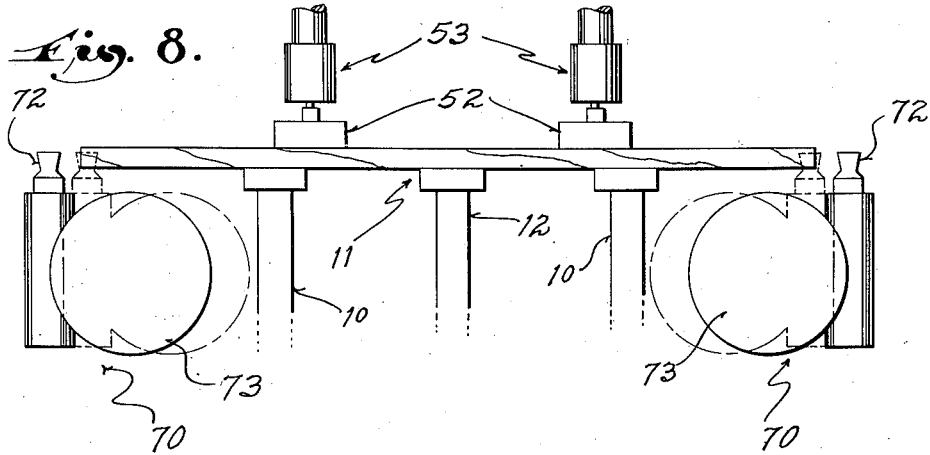
Figure 8 is a diagrammatic view similar to Figure 7 but illustrating the disposition of the cutting heads for the simultaneous cutting of dovetail mortises in the opposite ends of a single board of substantial length.

In the tenon cutting position of the cutting heads seen in Figure 7, the heads are swung on the axes of their gear housings from positions such as indicated in Figure 8 where the gear housings lie between the common planes of the cutters axes through an arc of 90° to positions with the dovetail cutters of the two assemblies facing each other to dispose their axes substantially in a common horizontal plane.

Figure 9:
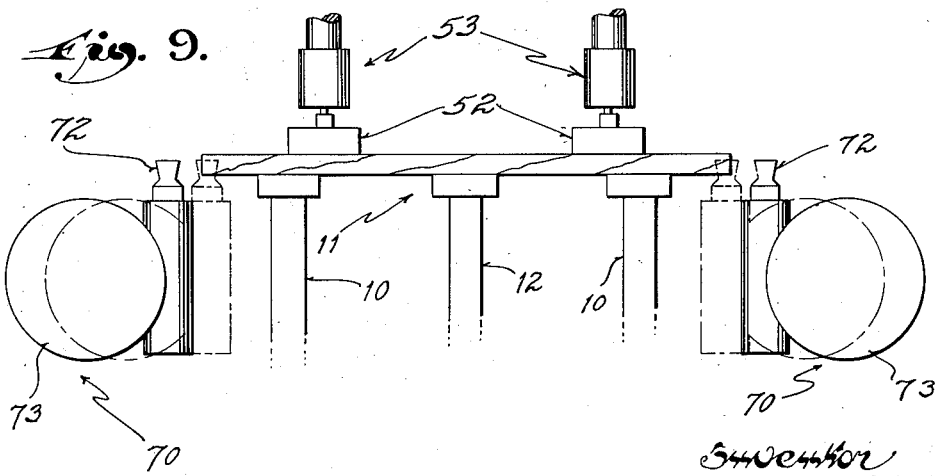
Figure 9 is a view similar to Figure 8 but showing the cutting heads reversed for the simultaneous cutting of dovetail mortises in the opposite ends of a single board of short length.

As is now about to be described, the opposite cutting head assemblies are reciprocated toward and from each other lengthwise of the base of the machine for the simultaneous performance of mortise cutting in the opposite ends of boards held in a fixed position on the work table when the heads are disposed as illustrated in either Figure 8 or Figure 9.

The cutting heads, when disposed as shown in Figure 7, are adapted to be driven with a bodily orbital motion, combining up and down movement of the heads transversely of the base 6, to carry the cutters thereof from positions beneath the ends of a pair of boards lying one on top of the other upwardly into the boards around an arc at the top of their orbital motion downwardly part way through the boards and around the bottom arc of their orbital motion to complete a substantially O shaped path through the boards. At the completion of the O the heads are lowered to their starting positions.

In order that the cutting heads may be locked in either their mortise or tenon cutting positions, the bearing cap 79 on each arm of the yoke 76 is provided with a pair of lugs 80 having holes 81 therein disposed 90° apart to receive a sliding pin or bolt 82 carried by the end wall of the elongated housing 73 remote from the motor.

In Figure 11 the pin 82 is shown projected into the hole 81 in the right-hand lug 80 on the bearing cap of the yoke to hold the head in a tenon cutting position, and it is only necessary to withdraw the pin from the hole in the right-hand lug to enable the head to be swung in a counterclockwise direction through an arc of 90° to dispose the head in a mortise cutting position in which it may be locked by projecting the pin 82 into the hole in the left-hand lug 80. Since the apertured lugs 80 are provided on the bearing caps of each arm of the yoke 76, it will be apparent that the pins 82 are operable to lock the heads in either of their positions shown in Figures 8 and 9, and which require reversing of the heads.

In addition to the yoke 76, each of the supporting structures 75 for the opposite cutting heads includes a reciprocable plate 83 which rests on the top surface of the base 6 and has a female dovetail groove such as indicated at 14 in its underside to slidably receive the male dovetail rail 15 on the base.

A gib 84 in the groove of the plate may be tightly clamped against the side of the male dovetail rail 15 as by a set screw 85 threaded into the plate 83 to enable the plate to be releasably locked in any desired position when reciprocatory motion of the supporting structure for mortising is halted and it is desired to cut tenons in the ends of the boards.

Each plate 83 is provided with a pair of upright standards or columns 86 one at each side of the rail 15 which project upwardly toward the cutting heads thereabove. A housing-like bracket 87 having hubs 88 thereon to slidably receive the upright columns 86 and to be constrained by the columns to up and down reciprocatory motion toward and from the base 6 provides for movably connecting of the yoke 76 to the plate 83 so that the cutting head, the yoke 76, the bracket 87, and the plate 83 constitute a cutting head unit.

Thus, it will be seen that reciprocatory motion of the plate 83 causes the cutting head to be likewise reciprocated toward and from the work table for the cutting of mortises while sliding motion of the bracket 87 up and down on the columns 86 relative to the base causes the cutting head to be raised and lowered to perform the straight stretches of the orbital motion necessary for the cutting of tenons in the ends of the boards.

Up and down motion of the cutting heads is effected by means of lift cams LC1 and LC2, one for each head, and each fixed on a shaft 91 journalled in bearings (not shown) carried by the spaced apart opposite side walls 89 of the bracket 87. These side walls 89 extend laterally crosswise of the base of the machine and mount the shaft 91 for rotation on an axis extending longitudinally of the base 6 of the machine. A cam follower or roller 92 engaging the periphery of each lift cam translates rotation of the cam into oscillation of a pair of lift levers 94 and 95.

The levers 94 and 95 are pivotally supported on the plate 83 at the top side of the plate by stub shafts 96 and 97, respectively, onto which the levers are fixed for oscillation of the levers on axes extending parallel to the axis of the shaft 91 on which the lift cam is mounted. The lever 94 has a relatively short lever arm 100 projecting laterally of the base toward the lift cam from which a lug 101 projects near the hub of the lever.

The opposite side pieces of a substantially H shaped link 102 embrace the lug 101 and have a pivotal connection thereto at one end as at 103 so that the link is pivotally supported from the lever. The opposite ends of the side pieces of the link embrace the lift cam and rotatably mount the cam follower 92 by means of a pin 104.

The link 102 is held in an extended position by means of a set screw 105 threaded in the cross piece 106 of the link to have its extremity rest against the top of the short lever arm 100 of the lever 94, and it follows, therefore, that initial rotation of the cam in a clockwise direction, indicated by the arrow in Figure 12, will cause the link 102 to react on the lever arm 100 through the medium of the set screw engaging therewith and effect swinging of the lever 94 in a clockwise direction about its axis of rotation.

Such clockwise oscillation of the lever 94 is translated into a lifting force on the rear hub 88 of the bracket 87 by means of spaced lift arms 108 on the lever embracing the rear column 86 through a roller 109 journalled between the free ends of the arms 108 and upon which the head of an adjusting screw 110 threaded into a boss 111 on the side of the adjacent hub 88 rests.

Oscillatory motion imparted to the lever 94 is transmitted into similar rotation of the shaft 97 to which the other lever 95 is keyed by means of arms 113 and 114 keyed to the shafts 96 and 97, respectively, and having their free ends connected by a link 115. It will be understood that the arms 113 and 114 are of the same length so that the shaft 97 rotates with the shaft 96 throughout the same angular distance of travel in consequence to rotation of the lift cam.

The lever 95 likewise has spaced apart lift arms 117 embracing the forward column 86 and equal in length to the lift arms 108 of lever 94 and also provided with a roller 118 journalled between their free ends on which the head of an adjusting screw 119 threaded into a lug 120 on the underside of the bracket 87 rests. Hence, it follows that depression of the cam follower by the initial rotation of the lift cam from its position shown in Figure 12 produces rotation of the shafts 96 and 97 in a clockwise direction to transmit equal lifting forces to opposite sides of the bracket 87 and thereby cause the same to move upwardly without binding on its columns 86.

The lift cams are designed so that initial rotation thereof from the position of the cam LC1, shown in Figure 12, carries the cam through a first period of dwell by engagement of a concentric peripheral surface 122 on the cam with the follower 92, and at the end of this relatively short period of dwell an outwardly curving initial lift surface 123 is brought to bear against the roller 92 to oscillate the shafts 96 and 97 in a clockwise direction and lift the bracket 87, the yoke 76 thereon, and the cutting head carried by the yoke a distance such as to carry the cutters from positions just beneath the ends of a pair of boards held flatwise together on the work table upwardly entirely through the lowermost and partly through the uppermost board from position "A" to position "B" as seen in Figure 6.

For this cutting operation it is, of course, necessary that the cutters be disposed with their axes horizontal and substantially in a single plane.

The lift cams are designed to terminate the lifting action at the time the cutters of the two heads reach their positions indicated by the letter "B" in Figure 6 to prevent the same from passing entirely through the uppermost board being acted upon, and further rotation of the lift cams brings a concentric surface 125 thereon to bear on their followers to initiate a second period of dwell.

During the second period of dwell, the cutting heads are adapted to be carried in a lateral arc of 180° (counterclockwise as seen in Figures 6 and 12) to swing the dovetail cutters from their positions indicated by the letter "B" to positions indicated by the letter "C" in Figure 6 so as to form the rounded ends of a series of dovetail tenons at the top surface of the uppermost board on the work table.

The mechanism for imparting such arcuate motion to the cutting head of each unit comprises two pairs of eccentrics 127, each pair of which is fixed on the opposite ends of a shaft 128 journalled for rotation in suitable bearings in the opposite side walls 89 of the bracket 87.

The shafts 128 rotate on axes parallel to and at opposite sides of the cam shaft 91. The yoke 76 likewise has spaced parallel side wall portions 126 which overlie the side walls of the bracket 87 and have bearings 129 thereon to rotatably receive the eccentrics 127 so that the cutting heads are actually carried by the eccentrics.

Rotation of the eccentrics 127 in a counter-clockwise direction through 180° of travel from their positions shown in Figure 12 thus cause the yoke and cutting head thereon to be moved in an arc to describe the top arc of orbital motion of the cutters.

Rotation of the eccentrics through one complete revolution obviously would impart a bodily orbital motion to the cutting head in a circular path, but inasmuch as the cutting of tenons in the opposite ends of the boards requires up and down motion of the cutting head between the top and bottom arcs of its orbital motion, intermittent gearing is employed to render the eccentrics periodically ineffective at times when the cutting head is moving either upwardly or downwardly.

The intermittent gearing for each set of eccentrics comprises a pair of small intermittent gears 130 one fixed on each of the eccentric shafts 128, and a large intermittent driving gear 131 mounted on the cam shaft 91 to rotate therewith. Each of the intermittent gears has a pair of diametrically opposite toothed portions separated by untoothed portions of the gears which have their unbroken peripheral surfaces engaged with one another as shown to enable rotation of the intermittent drive gear 131 without imparting rotation to the small intermittent gears 130 except at times when the opposite sets of teeth on the drive gear mesh with the teeth on the small gears.

The opposite disposition of the untoothed portions of the small gears thus limit rotation of the gears to half a revolution at a time. Hence, in the position of the parts as shown in Figure 12 the lift cam LC1, by engagement of its outwardly curved lifting surface 123 with the cam follower 92 effects elevation of the cutting head without imparting orbital motion thereto.

In other words, the lift cam and the intermittent gearing cooperate with each other in such a manner as to produce first a lifting motion of the cutting head from its position indicated in full lines in Figure 7 to its elevated position illustrated in dotted lines, and to thereafter carry the cutting head through the top arc of its orbital motion with the cutters traveling from position "B" to "C" as seen in Figure 6 by the meshing of the teeth of the intermittent gears to rotate the small gears through an angle of 180°

After rotation of the small intermittent gears through an angle of 180° the flats of the gears are again engaged with the cylindrical periphery of the eccentric drive gear 131 to preclude further rotation of the small gears and to enable the drive gear 131 to rotate relatively thereto until the opposite sets of teeth on the drive gear are again engaged with the teeth of the small intermittent gears.

After the cutting heads have been moved through the top arcs of their orbital motion the lift cams bring a surface 133 thereon which extends arcuately inwardly from the surface 125 of second dwell on the cams into engagement with their cam followers 92 so as to produce descent of the cutting heads to carry the dovetail cutters downwardly through the work with all but one of the cutters on each head passing through the next adjacent groove to the left produced previously on the upward travel of the cutting head.

The peripheries of the lift cams are provided with a third concentric surface 135 producing a third period of dwell and designed to halt downward travel of the cutting heads prior to passage of the cutters thereof through the lowermost board on the table.

During the third period of dwell the intermittent gearing again becomes effective to produce rotation of the eccentrics 127 in a counterclockwise direction through another arc of 180° to bring the same back to their positions illustrated in Figure 12 thereby completing the lower arc of orbital motion of the cutting heads and completing the oval shaped path of movement of the heads.

The cutters of each head thus travel in an arc at this time beginning from position "D" in Figure 6 directly beneath position "C" around the lower arc of their orbital motion to position "E" which motion rounds the ends of the tenons cut in the lower board on the table.

From position "E" the cutters are dropped to their starting positions "A" by the lift cams which bring a sharply inwardly angling surface 136 thereon into engagement with their cam followers 92 so that the cam followers are again brought to the small diameter concentric surfaces 122 of the cams comprising the period of first dwell thereof.

Such orbital motion of the cutting heads just described takes place simultaneously for both cutting heads during the time the hydraulic pusher unit C1 retracts under the magazine to a position at which it is again operative to feed another set of boards to the working position on the work table.

Although the cutting heads have been described as mounted by means of the yokes on the eccentrics 127, it will be apparent that the entire weight of the cutting head assemblies is carried by the lever arms 108 and 117 of the lift levers so that the cam followers 92 are at all times maintained in engagement with the peripheries of the lift cams.

Figure 13:
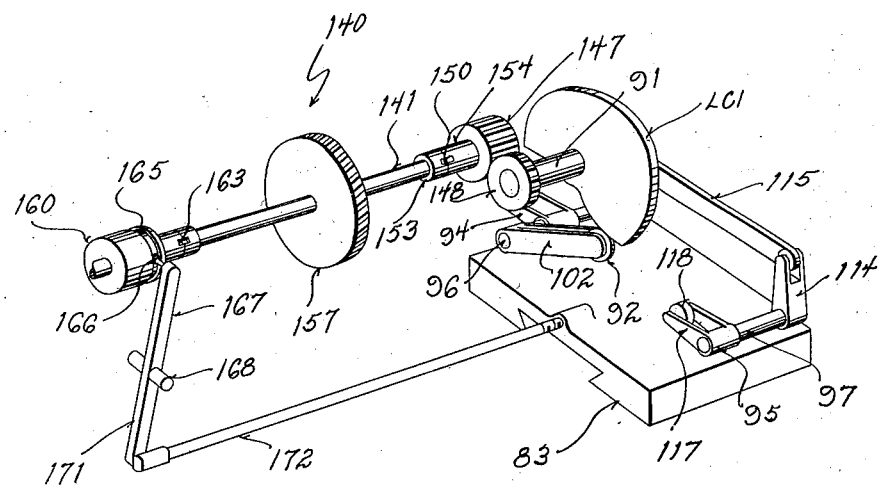
Figure 13 is a diagrammatic view illustrating the mechanism for imparting either reciprocatory or orbital motion to one of the cutting heads.
Figure 14:
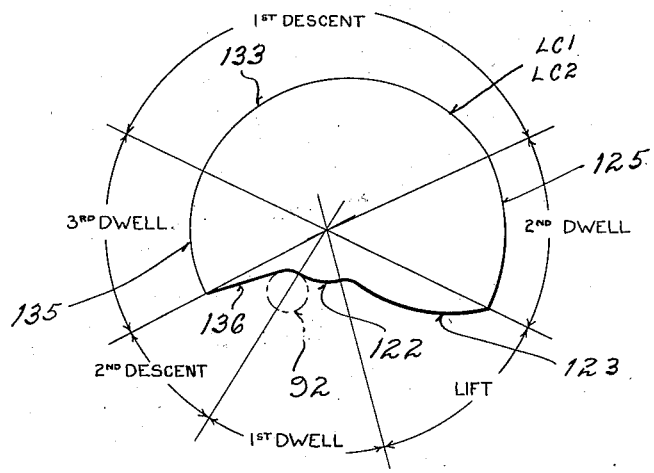
Figure 14 is a diagrammatic view of the lift cam employed in the orbit drive mechanism for one of the cutting heads.

Rotation is adapted to be imparted to the cam shaft 91 of each cutting unit by drive means generally designated 140. The drive means 140 as best seen in Figures 2, 11 and 13 comprises a power shaft 141 journalled for rotation in suitable bearings in a reduction gear housing 142 set on a mounting plate 143 between the end of the machine and the adjacent cutting head unit.

The mounting plate rests on the top surface 7 of the base and similarly to the bottom plate 83 of the cutting head supporting structure has a female dovetail such as indicated by the numeral 14 in Figure 12 whereby the mounting plate is slidably mounted on the dovetail rail 15 of the base.

A longitudinal adjusting screw 144 threaded into the mounting plate and rotatable by means of a hand wheel 145 at the end of the machine provides for longitudinal adjustment of the drive unit to any desired position on the base. The power shaft 141 is supported by the gear reduction housing 142 for rotation on an axis extending longitudinally of the base and parallel to the axis of the cam shaft 91 but is spaced to one side of the cam shaft axis as clearly shown in Figure 2.

A drive pinion 147 on the power shaft meshing with a gear 148 on the cam shaft 91 provides for drivingly connecting these shafts. It is to be noted that the gears 147 and 148 are of the same diameter, while the drive pinion 147 has teeth of substantial length so that during mortise cutting operations reciprocation of the cutting head in a manner to be hereinafter described may be accomplished without carrying the cam shaft gear out of mesh with the drive pinion.

Attention is also directed to the fact that although orbital motion of the cutting head relatively to the power shaft causes the driven gear 148 to move upwardly and downwardly alongside the drive gear 147, the extent of relative motion between the gears is such as to effect only a partial disengagement of the teeth of the gears without disrupting the driving connection between the power and cam shafts.

The drive pinion 147 has a readily detachable driving connection with the power shaft 141 afforded by means of a key 150 which may be secured in aligning keyways 151 and 152 formed jointly in the periphery of a collar 153 fixed on the power shaft and in a hub 154 on the gear 147 adjacent to the collar.

Since the gear 147 is loosely mounted on the power shaft it does not rotate therewith except when the key 150 is dropped into the aligning keyways in the collar 153 and the hub 154 and the key tightened to retain the same in the keyway by means of a set screw 155 passing through the key and threading into the collar 153.

Electric orbit drive motors M6 and M7, one for each drive means 140 and each supported directly on the gear reduction housing 142 of the drive means impart rotation to the power shafts 141. For this purpose, the motor shafts may each have a worm thereon (not shown) to drive a worm wheel 157 on the power shaft as shown diagrammatically in Figure 13, although other suitable gearing may be used to drive the power shaft at the comparatively slow rate of speed required.

The power drive to the cam shaft is effected between the gearing hereinbefore described which operates off the end of the power shaft projecting inwardly toward the center of the machine and the adjacent cutting head assembly. The power shaft, however, extends from the other side of the gear reduction housing toward the end of the machine as well, and has a cylinder cam 160 carried thereon.

The cylinder cam like the hub 154 of the drive pinion likewise has a keyway 161 in its outer cylindrical surface which is adapted to be aligned with a similar keyway 162 in the periphery of a collar 163 fixed on the power shaft between the cylindrical cam and the gear reduction housing. The keyways 161 and 162 are of such size that when aligned the same are adapted to receive the same key 150 used to drivingly connect the pinion 147 with the power shaft, and the screw 155 threads into a suitable hole in the collar to lock the key in place drivingly connecting the cylinder cam with the power shaft. Inasmuch as only one key 150 is used it follows that either the drive pinion or the cylindrical cam may be connected to the shaft at any one time while the other remains disconnected from the power shaft.

The cylindrical cam has a groove 165 in its periphery in which a cam follower 166 mounted on the end of one arm 167 of a lever 168 engages. The lever has a pivotal connection 169 with a lug 170 on the top side of the mounting plate 143 by which the lever is constrained to oscillatory motion on a horizontal axis extending transversely of the base with the arm 167 thereof generally upright.

The lever 168 has another arm 171 extending downwardly and substantially opposite the arm 167 which is connected by means of a link 172 to the bottom plate 83 of the supporting structure 75 so that rotation of the cam 160 with the power shaft when the key 150 is in place in the keyways formed in the cylindrical cam and collar 163 imparts back and forth reciprocatory motion to the entire cutting head unit to bodily move the cutting head toward and from the work table.

When both cutting head units are connected with their drive means in this manner and their dovetail cutters disposed with the planes of their common axes parallel to one another and disposed vertically, mortise cutting is performed simultaneously on the opposite ends of single boards held in the working position on the work table by the hydraulic holddowns 53.

It will be understood that at this time the drive pinions 147 are disconnected from their power shafts 141 to preclude transmission of any but bodily reciprocatory movement to the cutting heads.

While two boards held flatwise together on the work table by the holddown clamps have been shown acted upon by the opposite cutting heads for the simultaneous cutting of dovetail tenons in the opposite ends of both boards, it will be apparent that the machine of this invention may be employed for the cutting of dovetail tenons in single boards if so desired.

It is highly advantageous, however, that the tenon cutting operation be performed on a pair of boards held flatwise together on the work table inasmuch as chipping or gouging of the work is largely eliminated by this practice, and the quality of the work is further enhanced by reason of the fact that the orbital motion of the cutting heads simultaneously acting on opposite ends of the boards may be controlled to take place at a maximum safe rate of speed.

During either the mortise or tenon cutting operations the drill heads 64 are adapted to be lowered to bring their bits into the work in the event drawer fronts are being handled by the machine to provide holes for knobs or drawer pulls.

As stated previously, the drill heads are likewise carried by the bridge 9 and each is provided with an electric motor, said motor being designated M3 and M4, driving one or more bits 181 on each of the heads. Each of the drill head assemblies is conveniently mounted on one of the manifold blocks for the holddown clamps 53 and in the present case, the drill heads are shown positioned at opposite sides of the center holddown and rail 12. If but one drill head is to be employed, it is, of course, readily attached to the manifold block for the center holddown clamp.

In order to readily mount the drill heads, each of the holddown manifold blocks 54 is formed to receive the forward ends of a pair of rods 182 anchored in hubs on a mounting bracket 183 at their rear ends.

The mounting brackets 183 carry a block 184 at their rear faces and these blocks preferably have a pivotal connection (not shown) with the brackets to enable the blocks to pivot about a horizontal axis extending transversely of the base 6 of the machine.

A female dovetail groove 185 is cut vertically in the back face of each block to provide for mounting the drill heads for up and down reciprocatory motion to carry their bits downwardly into and upwardly out of work therebeneath. For this purpose, each of the drill heads has a hydraulic cylinder, said cylinders being designated C2 and C3, having a male dovetail slide 187 thereon received in the groove 185 of the block 184. The plunger 188 of the cylinder projects upwardly out of the top of the block 184 and is fixed in said block so as to be held stationary while the cylinder moves relatively thereto during the application of fluid pressure to the cylinder through a manifold 189 fixed on the upper exposed end of the plunger Attention is directed to the fact that the female groove 185 in the block 184 terminates near the top of the block to provide a stop for limiting retraction of the hydraulic cylinder.

Inasmuch as the electric motors and the drill bit drive mechanisms are carried directly by the hydraulic cylinders C2 and C3, it follows that reciprocation of the cylinders effects raising and lowering of the drill heads to enable the drill bit or bits thereof to be carried from an inoperative position spaced above the work table as shown downwardly to an operative position in which the drill bits move into and through the work held in a drilling position by the holddown extensions 65.

*Operation*

As will be readily understood the machine can be quickly switched from mortise to tenon cutting and vice versa, but in practice it is customary to do one or the other for the entire job before resetting the machine for the other cutting operation.

For tenon cutting the cutter heads are first adjusted to and locked in the tenon cutting position in which the axes of the cutters are disposed parallel to the plane of the work as shown in Figure 7 of the drawings. The space between the cutter heads is adjusted to the length of the boards being handled and the cams LC1 and LC2 are connected with the power shafts to impart orbital motions to the cutter heads. The feed mechanism for feeding boards to the dovetailing zone where the tenon cutting is performed, is adjusted for the width of the boards being handled. The feed mechanism is also adjusted so that the two lowermost boards in the magazine are forwarded by the feed plunger with each feed stroke.

With these adjustments made the machine is ready for tenon cutting. The magazine is then loaded with the boards to be machined and as the machine operates the feed plunger moves the two lowermost boards from the bottom of the magazine into the dovetailing zone where the hold-down clamps firmly clamp the boards to the work support. The cutters at the opposite ends of the boards then move in an orbital motion into and out of the adjacent ends of the boards to simultaneously form tenons on the opposite ends of the boards.

While the tenon cutting operation is being performed the feed plunger is retracted to allow the next two lowermost boards in the magazine to drop down into feed off position ahead of the plunger. After the cutters have moved out of the boards, the hold-down clamps are released and the feed mechanism again operates to move the next two lowermost boards in the magazine into the dovetailing zone and to move the boards with the tenons formed thereon out of the dovetailing zone and into a drilling zone on the work support where they are held by extensions on the hold-down clamps which have lowered to clamp the next two boards in the dovetailing zone. The cycle of the operation is then repeated and the drilling operation is performed during the tenon cutting operation.

It is, of course, to be understood that the drilling operation is independent of the tenon cutting operation so that if drilling is not required this operation can be dispensed with and the boards discharged from the machine directly after tenon cutting.

For mortise cutting the cutter heads are turned to dispose the cutters with their axes at right angles to the plane of the work as shown in Figure 8, and the cams LC1 and LC2 are disconnected from the power shafts and cams 160 are connected therewith to produce the reciprocatory motion of the cutters, and the feed mechanism is adjusted so that only one board, i. e. the lowermost one in the magazine, is moved into the dovetailing zone by the feed plunger. With these adjustments the machine is set up for mortise cutting, the actual sequence of operations for this work being the same as described for tenon cutting.

The automatic operation of the machine is best understood by reference to Figure 15, which is a combined hydraulic and electrical diagram. In this diagram the cylinder cams have not been shown, and it is to be assumed that they are disconnected from their orbit drive motors M6 and M7 while the cycle or lifting cams LC1 and LC2 are drivingly connected with their orbit motors M6 and M7 for cooperation with the intermittent gear driven eccentrics to produce the hereinbefore described orbital motion of the cutting heads for the cutting of male dovetails or tenons.

The spindle motors M1 and M2 for driving the dovetail cutters which simultaneously operate on both ends of the boards to be dovetailed are, for convenience, shown alongside the lift cams.

The hydraulic pump P mounted together with the sump or hydraulic fluid reservoir inside the base of the machine is diagrammatically shown driven by an electric motor designated M5 likewise mounted inside the base.

Fluid under pressure is supplied by the pump P to the pusher or feed cylinder C1 and the drill cylinders C2 and C3 through electromagnetic valves E1 and E2 respectively. The electromagnetic valve E1 has the further function of supplying the cylinders H1, H2 and H3 of the hydraulic holddowns with fluid under pressure simultaneously with retraction of the pusher cylinder C1 as will appear hereinafter.

The left and right hand orbit drive motors are designated M6 and M7 respectively and are shown for convenience, as directly driving the power shafts 141 although, as stated, a suitable gear reduction is employed for this purpose.

A drill cam DC and one snychronizing cam SC1 of a pair thereof, are shown driven by the orbit motor M6 through a chain drive 191 connecting the power shaft 141 with a stub shaft 192 (see Figure 2) mounted for rotation on the top side of the mounting plate 143 of the drive means 140 on a fixed axis parallel to but spaced forwardly of the power shaft 141. The chain drive is such as to drive the cams DC and SC1 at a rate of speed equal to that at which the lifter cam LC1 is driven.

The right-hand lifter or cycle cam LC2 is identical to the left-hand cycle cam LC1, but is driven by its motor M7 in a direction opposite to the direction of rotation of the cam LC1 and substantially at the same rate of speed. These cams are so related as to effect lifting and lowering of the cutting heads in unison.

Driven from the orbit drive motor M7 is a second synchronizing cam SC2 and a pusher or feed cam PC both fixed on a stub shaft 195 mounted in the same manner as the stub shaft 192 and drivingly connected with the power shaft 141 of the right-hand drive means through a chain drive 196 so as to rotate at the same rate of speed as the shaft 192 and both power shafts.

The function of the synchronizing cams is the same whether the orbit drive motors M6 and M7 are employed to reciprocate the opposite cutting heads into and out of the work as in the cutting of mortises or to produce the orbital motion previously described through the combined action of the lifting cams and the eccentrics.

With a stack of boards in place in the magazine, the machine is set for automatic operation by first closing a main switch 200 connecting lines L1, L2, and L3 with a suitable source of E. M. F.

The spindle motors M1 and M2 for the dovetail cutters, the drill motors M3 and M4 and the pump motor M5 may then be placed in operation by energization of starting relay R1 to R5, inclusive, one for each of said motors. Energization of these relays is accomplished by momentary closure of a start switch 201 of the normally open push button type.

For this purpose, one end of each of the solenoids for the relays R1 to R5, inclusive, is connected with a common conductor 202 which leads to line L3 serially through a normally closed stop switch 203 and the start switch 201. Since the opposite end of each of the solenoids for relays R1 to R5, inclusive, is connected to line L1 by a conductor 204 as shown, monentary depression of the push button start switch 201 effects simultaneous energization of relays R1 to R5, inclusive.

Each of the relays R1 to R5, inclusive, has four sets of contacts which close upon energization of the relays in this manner. Three sets of contacts on each relay connect its particular motor with the power lines L1, L2, and L3 to start the motors M1 to M5, inclusive. The remaining set of contacts on the relays establish holding circuits for the solenoids of the relays R1 to R5 inclusive.

The holding circuits for these relays all lead from line L1 through the conductors 204 connecting with one end of the solenoids and continue through the solenoids to the common conductor 202, through the normally closed stop switch 203, and are completed to line L3 through a conductor 205 joined to the conductor 202 between the start and stop switches 201 and 203, and which leads serially through all of the holding contacts for the relays R1 to R5. Naturally the holding circuits are established immediately upon closure of the switch 201, so that it may be released right after depression thereof.

Since the holding circuits for the coils of relays

R1 to R5, inclusive, depend upon bridging of the holding contacts of all of these relays as well as upon closure of the stop switch 203, it will be apparent that the relays are simultaneously deenergized to stop all of the motors M1 to M5, inclusive, either upon depression of the stop button 203 or opening of any set of holding contacts on the relays.

All of the motors may, if desired, be provided with overload relays (not shown) which operate in a conventional manner to deenergize the control relay for any overloaded motor, and thus break the holding circuit for all of the relay coils. The motors M1 to M5, inclusive, which drive the dovetail cutters, the drills, and the hydraulic pump are now in operation.

The orbital motion necessary to carry the cutting heads into and out of the work in timed relationship with feeding of boards to be dovetailed and discharge of dovetailed boards is not commenced until the orbit drive motors M6 and M7 are placed in operation by connection with the lines L1, L2, and L3. This is accomplished by depression of the button of a second start switch 201'. This switch together with a second stop switch 203' controls the operativeness of a master relay MR which in turn governs energization of the solenoids of orbit motor starting relays R6 and R7 for the motors M6 and M7 respectively.

The relay MR has two sets of contacts which are bridged upon energization of the relay in consequence to depression of the button of the start switch 201'. The energizing circuit for this relay leads from line L1 and a conductor 206 through the solenoid of the relay MR, the normally closed stop switch 203' and the temporarily closed start switch 201' onto a conductor 207 connecting with the conductor 202, through the stop switch 203 and to the line L3 through the conductor 205 and the serially connected holding contacts of the relays R1 to R5, inclusive.

Thus, the relay MR cannot be energized until all of the relays R1 to R5, inclusive are energized.

The lower set of contacts on the relay MR closed in consequence to energization of its solenoid in this manner establishes a holding circuit for the relay leading from line L1 through the conductor 206 and the coil of the relay, the stop switch 203' and a conductor 208, joined to the conductor 207 between the start and stop switches 201' and 203', which conductor 208 leads through the lower bridged contacts on the relay MR to the conductor 207 and the conductor 202 connected therewith, and thence to line L3 through the stop switch 203, conductor 205 and the serially connected holding contacts on the relays R1 to R5, inclusive.

Hence, it will be seen that the operativeness of the master relay MR likewise depends upon energization of the relays R1 to R5 and closure of the stop switch 203, and that the same is deenergized simultaneously with deenergization of any relay R1 to R5 or depression of the stop switch 203.

The top set of contacts on the relay MR cooperate with switches S1 and S2 which are controlled by the synchronizing cams SC1 and SC2, respectively, to govern energization of starting relays R6 and R7 for the orbit motors M6 and M7 respectively. The synchronizing instrumentalities are necessary by reason of the fact that the orbit drive motors M6 and M7 are not synchronous motors and it is desirable that the cutting operations performed at opposite ends of the work be effected substantially simultaneously.

The synchronizing switches S1 and S2 are of the single pole double throw variety and are adapted to be actuated simultaneously as long as either one of the orbit drive motors does not run ahead of the other. The switch S1 is shown with its movable contactor normally engaged with one stationary contact 211 to be disengaged therefrom and momentarily engaged with its other stationary contact 210 by the cam SC1 once each revolution thereof. Likewise the movable contactor of the synchronizing switch S2 is shown normally engaged with one of its stationary contacts 213 to be disengaged therefrom and momentarily engaged with its other stationary contact 212 by the cam SC2 once each revolution thereof.

The movable contactors of the synchronizing switches S1 and S2 connect with a conductor 214 through branches 214' and 214'', respectively, of the conductor 214 which leads to the conductor 202 and consequently to line L3, through the top contacts on relay MR and the conductor 207.

If one of the orbit drive motors should travel slightly faster than the other it follows that its synchronizing switch will be actuated by the synchronizing cam therefor ahead of actuation of the other synchronizing switch, for the purpose of effecting deenergization of the faster traveling orbit motor for the period of time required for actuation of the sychronizing switch for the slower traveling orbit drive motor.

As stated previously, closure of the top set of contacts on the relay MR effects energization of the starting relays R6 and R7 for the orbit drive motors M6 and M7 respectively.

This is accomplished in the case of the relay R6 through an energizing circuit which leads from the line L1 through a conductor 215 and one of the movable contactors 216 of an orbit motor selector switch 217 onto a conductor 218 connected with one end of the coil for the relay R6 with the circuit continuing through the coil relay R6, a conductor 219 and one branch 219' thereof to the stationary contact 211 of the synchronizing switch S1, through the movable contactor of the switch engaged therewith onto the branch 214' of conductor 214 which latter leads through the closed top contacts of the relay MR and the conductor 207 to the conductor 202, from where the circuit is completed to line L3 through the stop switch 203, the conductor 205 and the serially connected holding contacts of the relays R1 to R5 inclusive.

Each of the relays R6 and R7 has but three sets of contacts and closure of the contacts of the relay R6 upon its energization in this manner connects the orbit drive motor M6 with the power lines L1, L2 and L3 through the relay contacts.

The relay R7 for starting the orbit drive motor M7 is energized upon bridging of the top contacts of the master relay MR by a circuit which leads from line L1 through a conductor 220 and the other movable contactor 221 of the selector switch 217 onto a conductor 222 connecting with one end of the solenoid for the relay R7, with the circuit continuing from the other end of the coil through a conductor 223 and one branch 223' thereof to the stationary contact 213 of the synchronizing switch S2 and leading through the movable contactor of the switch engaged therewith and the second branch 214'' of the conductor 214 across the bridge top contacts of the master relay MR and onto the conductors 207 and 202, through stop switch 203, the conductor 205, and the serially connected holding contacts of the relays R1 to R5, inclusive, to line L3.

Energization of the relay R7 in this manner connects the orbit drive motor M7 across the lines L1, L2 and L3 through the relay contacts to start the motor M7.

Both orbit motor M6 and M7 are now operating, and with the lifting or cycle cams LC1 and LC2 driven thereby in matching positions as shown in the diagram, rotation of these cycle cams carries first through an initial period of dwell as previously brought out.

During the period of first dwell on the lifting cams work is fed from the hopper laterally into the machine and under the shoes of the holddowns H1, H2 and H3. This operation is controlled by means of the pusher cam PC which rotates with the power shaft driven by the orbit motor M7, and which effects closure of a normally open switch S3 at the start of the first dwell period on the lifting cam to complete an energizaing circuit for the solenoid of a pusher PR controlling operation of the solenoid for a hydraulic valve E1 by which the pusher cyclinder C1 is connected with and disconnected from a source of fluid under pressure.

The energizing circuit for the relay PR leads from line L1 through a conductor 230 and the coil of the pusher relay PR onto a conductor 231 leading through the now closed switch S3 and a conductor 233 connected with the contactor of the switch S3 and with the conductor 207, to be completed to line L3 through the conductor 202, stop switch 203, the conductor 205, and the serially connected holding contacts of the relays R1 to R5, inclusive.

The pusher relay PR has two sets of contacts which when bridged by energization of the relay in the manner described connect the solenoid for the electromagnetic valve E1 across the lines L1 and L3 in a manner clear from the diagram.

Energization of the solenoid of valve E1 in this manner draws the spool of the valve to the right from its normal position shown so that fluid under pressure from the outlet of the pump P flows through a pressure duct 234 and the valve into a duct 235 leading to the bottom of the cylinder C1, to force the cylinder outwardly with respect to its piston. Consequently, for male dovetailing, two boards are carried from the bottom of the stack in the magazine and fed into the machine under the holddowns H1, H2 and H3.

The position of the valve E1 when energized to produce the feed stroke of the cylinder C1 is such that fluid pressure in the holddown cylinders H1, H2 and H3 is relieved through a duct 236 leading to all of the holddown cylinders. The duct 236 is communicated through the valve E1 at this time with ducts 237 and 237' leading to the fluid sump or reservoir R.

The extent to which the boards are fed into the machine by the pusher cylinder is, of course, determined by the cam PC and the duration for which this cam holds the switch S3 closed. It will be readily appreciated that the cam PC may be formed of two cooperating angularly adjustable cam sections by which fine and accurate adjustment of the duration of closure of the switch S3 may be obtained to enable the feed stroke of the pusher cylinder C1 to be accurately set in accordance with boards of different widths.

After the boards to be cut have been fed into the machine, continued rotation of the cam PC causes the switch S3 to open and consequently effects deenergization of the coil of the pusher relay PR, which accordingly results in deenergization of the solenoid valve E1. The spool of the valve E1 thus is returned to its normal position shown by the biasing spring acting thereon to terminate the feed stroke of the cylinder C1 and immediately initiate its return stroke.

As soon as the valve E1 becomes deenergized, however, the pressure duct 234 is communicated by it with the holddown cylinders H1, H2 and H3 through the duct 236 which thereby are actuated to effect clamping of the work onto the top of the work table.

Retraction of the pusher cylinder C1 is effected immediately upon deenergization of the valve E1 by the flow of fluid under pressure from the duct 234 through the valve E1 and duct 236 into a duct 238 connecting with the duct 236 and leading to the cylinder rearwardly of the piston on the plunger of the cylinder.

The duct 238, however, has two "parallel" branches 238' and 238" with a throttle valve 239 in the branch 238' and a check valve 240 in the branch 238". The check valve is set to freely pass fluid through the branch 238" for retraction of the cylinder C1 so that the cylinder rapidly brings the pusher plate thereon back under the pile of boards in the magazine in readiness for the next feed stroke.

On the feed stroke of the cylinder C1, however, the fluid expelled from the cylinder flows out through duct 238 and since its passage through branch 238" is blocked by the check valve 240, it must flow through the branch 238' and the throttle valve 239 therein for return to the sump. The throttle valve slows the feed stroke to a speed less than the retracting stroke of the cylinder to insure proper feeding of the boards.

During return of the cylinder C1 to its retracted position shown, hydraulic fluid is exhausted from the bottom of the cylinder through the duct 235 and delivered through the valve E1 into a branch 237' of duct 237 leading to the sump R.

After the boards fed into the machine to their proper work positions have been clamped onto the work table by the holddowns H1, H2 and H3, the lifting cams LC1 and LC2 have rotated sufficiently far as to effect elevation of both dovetail cutter heads simultaneously bringing their cutters up to and part way through the work. This elevation of the cutting heads is accomplished by rotation of the cams through a relatively small angle and brings the second concentric peripheral portion 125 on the cams to bear against the cam followers to produce the second period of dwell.

During this second period of dwell, the intermittent gearing becomes effective to drive the eccentrics through one-half a revolution to thereby swing the cutting heads up and around through the top 180° arc of their orbital motion.

At any time during the second period of dwell, the drilling operation which, of course, is optional may be performed on boards previously cut and pushed out from under the holddowns by the feeding action of the pusher cylinder C1.

The drill heads are caused to descend to engage their bits into the work pushed from cutting to drilling position by closure of a switch S4 actuated by the cam DC.

When the switch S4 is closed it completes an energizing circuit through the coil of a drill relay DR which in turn controls energization of the electromagnetic valve E2 through which the flow of fluid to the drill cylinders C2 and C3 is controlled. The energizing circuit for the coil of the relay DR leads through a conductor 242 connected to line L1, through the coil of the relay onto a conductor 243 which leads through the normally closed contacts of a limit switch LS onto a conductor 244 joining with a conductor 245 which leads to the single stationary contact of the switch S4, through the movable contactor of the switch now engaged therewith and onto a conductor 246 which joins with the conductor 207 so that the circuit is completed to the line L3 through the conductor 202, the stop switch 203, the conductor 205 and the serially connected holding contacts of the relays R1 to R5, inclusive.

The drill relay has three sets of contacts two of which now connect the coil of the electromagnetic valve E2 across lines L1 and L3 to actuate the valve. The third set of contacts now complete a holding circuit for the coil of the relay DR which leads from line L1 through the conductor 242, the coil of the relay DR, conductor 243, the closed limit switch LS, conductor 244, and the conductor 245 joined therewith and which leads through the holding contacts of the relay onto the conductor 207 leading to the line L3 through the conductor 202, the stop switch 203, the conductor 205, and the serially connected holding contacts of the relays R1 to R5, inclusive.

The drill relay DR and the valve E2 are thus maintained energized even after the switch S4 opens in consequence to further rotation of the drill cam DC to be deenergized upon opening of the limit switch LS. This is accomplished by a toe 247 adjustably carried by one of the drill cylinders (C2 in the diagram) and set to trip the switch just after the drills pass completely through the work.

Energization of the electromagnetic valve E2 which is accomplished by bridging of the two top sets of contacts on the drill relay DR causes the spool of the valve to be moved to the left from its normally inoperative position shown to connect the pressure duct 234 with a duct 248 leading to the bottom of both hydraulic drill cylinders C2 and C3 beneath the piston therein to force the drill heads downwardly.

After opening of the limit switch LS in the manner described, the valve E2 is deenergized and the spool of the valve returned to its normal position shown to connect the pressure duct 234 with a duct 249 having branches 249' and 249'' leading to the top side of the pistons inside the drill cylinders C2 and C3 to retract the cylinders and the drill heads carried thereby.

Metering check valves 251 are embodied in the branches 249' and 249'' of the duct to retard the flow of fluid expelled from the cylinders during their descent to carry their drill bits into the work, but these valves are designed to freely pass the fluid through the branch ducts 249' and 249'' during retraction of the cylinders. Hence, the drill heads are lowered at a slow rate of speed to prevent injury to the work in the drilling operation but are retracted at a much higher rate of speed.

When the electromagnetic valve E2 is returned to its deenergized position shown to effect retraction of the drill heads, the hydraulic fluid in the cylinders below the pistons is exhausted through the duct 248 and the valve and returned to the sump R through the ducts 237 and 237'. With the valve E2 in an actuated condition causing slow descent of the drill heads, the hydraulic fluid in the drill cylinders above the pistons is exhausted through the branch ducts 249' and 249'' and the metering check valves 251 therein, the duct 249 leading through the valve, and returned to the sump through the ducts 237 and 237'.

The drilling operation is completed some time during the interval in which the cam followers ride on the surfaces 125 of second dwell on the lifting or cycle cams LC1 and LC2. The arcuate descent surfaces 133 of the cams next brought to bear on the cam followers is such as to cause the cutting heads to descend simultaneously (from their top arcs) part way through the boards.

The cycle cams LC1 and LC2 are thus designed to interrupt downward motion of the cutting heads before the dovetail cutters are brought all the way through the lowermost board on the work table and this is effected at the time the cam followers ride off the descent surfaces 133 of the cams and onto the concentric surfaces 135 providing a period of third dwell substantially diametrically opposite the surfaces of second dwell on the cams.

In this third or last period of dwell, the intermittent gearing again becomes operative to produce rotation of the eccentrics through another one-half revolution thereby causing the cutting heads to travel down and around through the bottom 180° arc of their orbital motion and bringing the cutters a short distance into the grooves cut thereby on their initial upward travel.

At the completion of orbital motion of the cutting heads through their bottom arcs, the further rotation of the cycle cams LC1 and LC2 effects lowering of the cutting heads out of the work to their starting positions through engagement of the second descent surfaces 136 on the cams with their cam followers.

One complete work cycle for tenon cutting in the opposite ends of a pair of boards held flatwise together on the work table has been described in the foregoing and it will be apparent that the cycles repeat themselves automatically in endless succession, it being merely necessary to manually load boards to be cut into the magazine at the front side of the machine.

As stated previously, it is desirable that both orbit drive motors M6 and M7 operate at substantially the same speed so that all of the cutting operations including the orbital travel of the cutting heads take place substantially simultaneously. This is accomplished by means of actuation of the synchronizing switches S1 and S2 by their respective synchronizing cams SC1 and SC2, which as previously stated, are driven from the orbit drive motors M6 and M7. The cams SC1 and SC2 are so angularly related as to effect simultaneous actuation of the synchronizing switches when the orbit drive motors are operating at the same rate of speed.

Assuming that the orbit motor M6 for some reason travels slightly faster than and gets "ahead of" the orbit motor M7, its synchronizing switch S1 is consequently actuated ahead of the synchronizing switch S2 for the motor M7 to engage the movable contactor of the switch with its stationary contact 210 and to disengage it from the contact 211.

Such action of the switch S1 breaks the energizing circuit for the coil of the starting relay R6 for the orbit drive motor M6 and establishes an auxiliary or alternate energizing circuit for the coil of the starting relay R7 controlling operation of the orbit drive motor M7 by joining conductors 214' and 223". The orbit drive motor M6 thus remains inoperative until continued rotation of the synchronizing cam SC2 actuates the synchronizing switch S2 to disengage the movable contactor thereof from the stationary contact 213 and to engage the contactor with the cooperating stationary contact 212.

At the time of actuation of switch S2 in this manner, an energizing circuit is completed for the coil of the deenergized starting relay R6 to effect restarting of the orbit drive motor M6. This energizing circuit leads from line L1 through the conductor 215, the movable contactor 216 of the selector switch and the conductor 218, through the coil of the relay R6 and onto conductor 219 to its branch 219" connected with the stationary contact 212, through the movable contactor of the switch S2 which is now engaged with the stationary contact 212 and onto the conductors 214" and 214 through the top contacts of the master relay MR onto the conductor 207 leading to the conductor 202, to be completed to line L3 through the stop switch 203, conductor 205 and the serially connected holding contacts of the relays R1 to R5, inclusive.

Attention is directed to the fact that actuation of the switch S2 in the manner described to restart the orbit drive motor M6 disrupts the initial energizing circuit for the coil of the starting relay R7 for the orbit drive motor M7, but the motor M7 is not stopped at this time since the auxiliary or alternate energizing circuit resulting from actuation of the switch S1 to engage its contactor with the contact 210 remains effective.

The synchronizing instrumentalities thus have the effect of momentarily stopping a faster traveling orbit drive motor and restarting the same at the time of opening of the synchronizing switch of the properly operating orbit drive motor without stopping the last designated motor.

As soon as the orbit motor M7 is restarted its cam SC1 and the cam SC2 driven by the orbit motor M7 again actuate the synchronizing switches S1 and S2 in unison to return the same to their positions illustrated in the diagram, and both orbit motors continue in operation.

Inasmuch as the synchronizing cams SC1 and SC2 travel at the same rate of speed as the work cycle or lift cams LC1 and LC2 it will be apparent that the orbit drive motors will rotate through the same number of revolutions for each work cycle of the machine represented by one complete revolution of the lift cams LC1 and LC2, to produce substantially simultaneous actuation of the cutting heads.

Obviously a similar procedure takes place in the event the orbit drive motor M7 "gets ahead of" the orbit motor M6 during any work cycle. It is likewise stopped momentarily and restarted at the time of subsequent actuation of the synchronizing switch for the orbit drive motor M6 without interfering with the operation of the orbit motor M6. The circuits for stopping and restarting the orbit motor M7 are believed clear from the diagram.

The entire machine may be stopped merely by depression of the stop button 203 which simultaneously effects deenergization of the motor starting relays R1 to R7, inclusive, the master relay MR, and the drill and pusher relays DR and PR if the same happen to be energized at the time of depression of the stop button.

The operation of the machine in the cutting of female dovetails or mortises is only slightly different than that described hereinabove. In this latter case the drive between the lift cams LC1 and LC2 and their power shafts 141 is disconnected and the driving connection established between the cylinder cams 160 and the power shafts to produce an in and out reciprocatory motion of the cutting heads. Hence, the dovetail cutters must be swung to operate on vertical axes so that they are carried into and out of the end edges of single boards on the work table to produce mortise cuts therein.

The drill cam likewise may be disconnected if desired since holes for handles or drawer pulls may not be necessary on all work passed through the machine. Obviously, a switch (not shown) placed in the energizing circuit for the coil of relay DR so as to be in series with the switch S4 would obviate the necessity of disconnecting the drill cam DC from its shaft 192 when the drilling operation is to be omitted. The synchronizing cams SC1 and SC2, however, and the pusher cam PC remain drivingly connected with the orbit motors M6 and M7 to carry out operation of the machine in an automatic manner.

In either instance the dovetail cutters may be caused to operate on the opposite ends of boards to be cut, or either one or the other of the orbit motors may be stopped to permit cutting of dovetails at one end only of the boards. This is accomplished by means of the selector switch 217 which when in the middle position as indicated in the diagram connects both orbit motors for operation. When the selector switch is moved to the left it prevents energization of the orbit motor starting relay R7, and when the switch is shifted to the right it prevents energization of the orbit motor relay R6.

However, since the feed cam PC is driven from the orbit drive motor M7, it is desirable to employ the right-hand cutting head if dovetailing is to be performed on only one end of the boards. This follows from the fact that automatic feeding and discharge of cut boards as well as functioning of the holddown clamps is possible only when the orbit motor M7 is in operation.

It will also be readily apparent that the drill cam DC can be mounted on the shaft 195 with the cam PC if only one cutting head is to be employed so as to enable automatic control of the drilling operation.

With only the orbit drive motor M7 operating, it is also necessary to render periodic opening of the synchronizing switch S2 ineffective. This may be readily accomplished by latching the actuator of switch S1 in engagement with its stationary contact 219 to at all times maintain one energizing circuit for the coil of relay R7 controlling operation of the motor M7.

From the foregoing it will be readily apparent that the machine of this invention is automatically operable to feed one or a pair of boards from a magazine into a work position on the work table of the machine concomitantly with ejection of dovetailed boards out of the work position to a predetermined drilling position; and that the opposite cutting heads are automatically moved during the time the boards are clamped in the working position to carry their cutters into and out of cutting engagement with the work so that the mortise and tenon cutting operations are performed simultaneously at opposite ends of the boards.

As a result of the automatic operation of the dovetailing machine of this invention, it will be readily apparent that manual handling of the boards which was so time consuming and objectionable with past dovetailing machines is largely eliminated, it being necessary for an operator to merely keep the magazine filled.

In this respect it is desired to point out that the feeding action of the pusher unit in delivering boards to the drilling position is also capable of pushing drilled boards off the work table of the machine into a suitable receptacle alongside the rear of the work table if desired so that it is not absolutely necessary to station an operator at the rear of the work table to remove the finished boards.

Aside from the advantage of substantially eliminating manual handling of the boards to be cut, the machine of this invention is highly advantageous by reason of the fact that it enables greatly increased production and insures high quality workmanship.

What I claim as my invention is:

1. In a dovetailing machine: a stationary work support; a cutting head including a series of cutters constrained to rotate on parallel axes lying in a common plane; means mounting the cutter head for movement from a mortise cutting position at which the common plane of the cutter axes is normal to the flat sides of work on the work support to a tenon cutting position at which the plane of the common axes of the cutters is parallel to the flat sides of work on the support; means for selectively locking the cutter head in either one of said two positions; and alternate drive means connected with said cutting head for selectively imparting either bodily reciprocatory motion thereto in a direction toward and from work held in a fixed position on the work support to effect mortise cutting when the cutting head is in its mortise cutting position, or for moving said cutting head bodily with an orbital motion in a path normal to said reciprocatory travel of the head to effect tenon cutting when the cutting head is in its tenon cutting position.

2. A woodworking machine of the character described comprising, in combination: a pair of cutting heads each of which includes a cutter assembly having cutters rotatable on axes parallel to one another and lying in a common plane; drive means for rotating said cutters; work supporting and gripping means including a work supporting surface between the cutting heads for holding work to be dovetailed in a fixed position with the work extending between the cutting heads; means mounting each cutting head for bodily motion from a mortise cutting position at which the common plane of the cutter axes is normal to said work supporting surface to a tenon cutting position at which the common plane of the cutter axes is parallel to said surface of the work supporting means; means for selectively locking the cutter heads in either of said two positions; means for bodily reciprocating said cutter head assemblies in a path parallel to said work supporting surface toward and from work held in a fixed position thereon to enable the cutter assemblies when disposed in their mortise cutting positions to be carried into and out of the work held by the work supporting means to effect mortise cutting on the ends of the work adjacent to the cutting heads; and means providing for driving said cutter heads bodily in an orbital path normal to said work supporting surface to effect tenon cutting of the work when the cutting assemblies are disposed in their tenon cutting positions.

3. In a woodworking machine of the character described: a base; a work support on the base; a pair of identical cutting heads each comprising a series of dovetail cutters rotatable on axes fixed with respect to the cutting heads and lying in a common plane; brackets movably mounted on the base, one at each end of the work support; means readily detachably mounting one of said cutter heads on each bracket, said means enabling the heads to be interchanged and permitting pivotal motion of each cutting head about an axis transverse to the cutter axes and spaced a distance to one side of the common plane of the cutter axes to enable the heads to be swung from a tenon cutting position at which the cutters of the two heads extend toward and face each other and have their axes extending lengthwise of the work support, to a mortise cutting position at which the common planes of the cutter axes are parallel to one another, the interchangeability of the heads allowing disposition of the cutting heads with the common planes of the cutter axes parallel to one another and with the pivot axes of the heads between said planes for the cutting of mortises in the ends of boards having predetermined length, while allowing disposition of the cutting heads with the common planes of the cutter axes parallel but located between the pivot axes of the heads for the cutting of mortises in the ends of boards having less than said predetermined length; cooperating means on the cutting heads and their brackets for locking the cutting heads against pivotal motion in either of said tenon or mortise cutting positions thereof; and alternate drive means connected with each of said brackets and acting therethrough for selectively imparting either bodily reciprocatory motion to said cutting heads in a direction to carry the same to and from work held in a fixed position on the work support to effect mortise cutting when the cutting heads are in their mortise cutting positions, or for moving said cutting heads bodily with an orbital motion in a path normal to reciprocatory travel of the heads to effect tenon cutting when the cutting heads are in their tenon cutting positions.

4. In a woodworking machine of the character described: a base; means for supporting work in a fixed position on the base; a standard mounted on the base for reciprocatory motion in one direction relative thereto; a yoke; a connection between the yoke and the standard whereby the yoke moves bodily therewith and is capable of orbital motion relative to the standard in a plane transverse to reciprocatory motion of the standard; a cutting head supported by the yoke for bodily pivotal motion on an axis lying transversely of the direction of standard reciprocation, said cutting head including a series of dovetail cutters rotatable on parallel axis lying in a common plane; means for locking the cutting head to the yoke with the common plane of the cutter axes lying either at right angles or parallel to said plane of motion of the yoke; a rotatable power shaft; and means for translating rotation of the power shaft either into reciprocatory motion of the standard to carry the yoke and cutting head assembly therewith toward and from work to be acted upon by the cutters or for translating motion of the power shaft into orbital motion of the yoke and cutting head carried thereby relative to the standard in said plane normal to reciprocatory motion of the standard, to enable mortise cutting when the head is locked in its position disposing the common plane of the cutter axes parallel to said plane of motion of the yoke by reciprocation of the standard to carry the cutting head toward and from the work, and to enable tenon cutting when the head is located in its position disposing the common plane of the cutter axes at right angles to the plane of motion of the yoke by orbital motion of the yoke relative to the standard.

5. In a dovetailing machine; a cutter head; means mounting the cutter head for reciprocatory motion; other means mounting the cutter head for orbital motion in a path normal to the direction of the reciprocatory motion; a rotatable power shaft; and drive means selectively connectible between said power shaft and the cutter head for translating rotation of the power shaft either into reciprocatory or orbital motion of the cutter head.

6. In a dovetailing machine: a base; a plate mounted for reciprocatory motion on the base; a cutter head including a series of cutters constrained to rotate on parallel axes lying in a common plane, and drive means for rotating the cutters; means mounting the cutter head on the reciprocable plate for movement therewith and for orbital motion relative to the plate in a path normal to the direction of reciprocatory motion of the plate; a rotatable power shaft; drive means for the reciprocable plate connectible with the power shaft for translating rotation of the power shaft into reciprocatory motion of the plate and the cutter head carried thereon; other drive means for the cutter head connectible with the power shaft for translating rotation of the power shaft into orbital motion of the cutter head relative to the plate; and means for selectively connecting the rotatable power shaft to either one of said drive means.

7. The dovetailing machine set forth in claim 6 further characterized by the fact that the drive means for imparting orbital motion to the cutter head comprises: a cam and a cam follower for effecting back and forth motion of the cutter head in one direction in consequence to rotation of the cam; and rotatable eccentric means constrained to rotate in synchronization with the rotatable cam for shifting the cutter head back and forth in a direction crosswise to its cam produced motion.

8. The dovetailing machine of claim 7 wherein the means for effecting synchronization between the cam and the eccentric means comprises: a pinion fixed with respect to the eccentric of said eccentric means; and a driving gear for the pinion rotatable in unison with the rotatable cam, the pinion and the gear having interrupted gear teeth thereon to effect intermittent rotation of the pinion and the eccentric as the cam rotates.

9. In a dovetailing machine: a base; a movable plate mounted for reciprocation on the base; a cutter head including a series of cutters constrained to rotate on parallel axes lying in a common plane; a supporting structure for the cutter head to support the same upon the plate for orbital movement relative thereto; a cam controlled drive mechanism on the plate for producing orbital motion of the supporting structure and the cutter head carried thereon relative to the plate; a second cam controlled drive mechanism mounted on the base for producing reciprocatory motion of the plate and the supporting structure with the cutter head thereon relative to the base; a drive motor; a rotatable power shaft mounted on the base and driven by the motor; detachable drive connections between the power shaft and each of the cam controlled drive mechanisms; and means for selectively rendering one or the other of said drive connections operative.

HENRY J. ECK.

REFERENCES CITED

The following references are of record in the file of this patent:

UNITED STATES PATENTS

| Number | Name | Date |
|---|---|---|
| 226,904 | Culver | Apr. 27, 1880 |
| 811,377 | Cleveland | Jan. 30, 1906 |
| 851,123 | Erickson | Apr. 23, 1907 |
| 854,410 | Erickson | May 21, 1907 |
| 890,743 | Winberg | June 16, 1908 |
| 1,220,540 | Parent | Mar. 27, 1917 |
| 1,258,082 | Anderson | Mar. 5, 1918 |
| 1,702,185 | Weber | Feb. 12, 1929 |
| 2,225,263 | Farrell | Dec. 17, 1940 |
| 2,260,662 | Farrell | Oct. 28, 1941 |
| 2,299,602 | Teague | Oct. 20, 1942 |
| 2,436,941 | Sendorykas | Mar. 2, 1948 |

FOREIGN PATENTS

| Number | Country | Date |
|---|---|---|
| 104,246 | Australia | June 14, 1938 |